(12) United States Patent
Taylor et al.

(10) Patent No.: US 10,065,383 B2
(45) Date of Patent: *Sep. 4, 2018

(54) METHOD OF MANUFACTURING A FLUID-FILLED CHAMBER WITH A TENSILE ELEMENT

(71) Applicant: NIKE, Inc., Beaverton, OR (US)

(72) Inventors: Danielle L. Taylor, Portland, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/133,342

(22) Filed: Apr. 20, 2016

(65) Prior Publication Data
US 2016/0229143 A1 Aug. 11, 2016

Related U.S. Application Data

(63) Continuation of application No. 13/839,747, filed on Mar. 15, 2013, now Pat. No. 9,339,080.

(51) Int. Cl.
*B32B 7/08* (2006.01)
*A63B 39/00* (2006.01)
(Continued)

(52) U.S. Cl.
CPC ............ *B29D 35/142* (2013.01); *A43B 13/20* (2013.01); *A43B 21/28* (2013.01); *B29D 35/00* (2013.01);
(Continued)

(58) Field of Classification Search
CPC ......... A43B 13/20; A43B 21/28; B29C 65/00; B29C 65/02; B29C 65/18; B29C 65/56;
(Continued)

(56) References Cited

U.S. PATENT DOCUMENTS 2,968,105 A   1/1961 Rizzo
3,526,199 A * 9/1970 Keats .................. G09F 7/00
                                                    116/63 P
(Continued)

FOREIGN PATENT DOCUMENTS

CN    1856262 A    11/2006
CN  101072520 A    11/2007
(Continued)

OTHER PUBLICATIONS

International Search Report and Written Opinion for PCT Application No. PCT/US2014/025178, dated Oct. 6, 2014.
(Continued)

*Primary Examiner* — Philip C Tucker
*Assistant Examiner* — Brian R Slawski
(74) *Attorney, Agent, or Firm* — Honigman Miller Schwartz and Cohn LLP; Matthew H. Szalach; Jonathan P. O'Brien

(57) ABSTRACT

A method of manufacturing a fluid-filled chamber with a tensile element includes manufacturing a tensile element and incorporating the tensile element into a chamber. A first material layer, a second material layer, and a spacing structure having a plurality of support portions and a plurality of gaps may be stacked. The material layers may be located on either side of the spacing structure or on one side of the spacing structure. A strand may be stitched through the gaps to join the material layers and to form the tensile element. The spacing structure may be removed, and the first material layer may be spaced from the second material layer such that segments of the strand extend between the material layers. The tensile element may then be secured to opposite interior surfaces of an outer barrier, and the outer barrier may be pressurized to place the strand in tension.

20 Claims, 42 Drawing Sheets

(51) Int. Cl.
  *A63B 41/00* (2006.01)
  *B29C 65/00* (2006.01)
  *B32B 37/00* (2006.01)
  *C08J 5/00* (2006.01)
  *C09J 7/00* (2018.01)
  *A43B 13/20* (2006.01)
  *B29D 35/14* (2010.01)
  *B32B 27/08* (2006.01)
  *A43B 21/28* (2006.01)
  *B29D 35/12* (2010.01)
  *B29D 35/00* (2010.01)
  *D05B 15/04* (2006.01)
  *B29C 65/18* (2006.01)
  *B29C 65/62* (2006.01)
  *B29C 65/72* (2006.01)
  *B32B 38/00* (2006.01)
  *B32B 37/04* (2006.01)
  *B29K 105/04* (2006.01)

(52) U.S. Cl.
  CPC ......... *B29D 35/122* (2013.01); *B29D 35/124* (2013.01); *B29D 35/144* (2013.01); *B32B 27/08* (2013.01); *D05B 15/04* (2013.01); *B29C 65/18* (2013.01); *B29C 65/62* (2013.01); *B29C 65/72* (2013.01); *B29C 66/43* (2013.01); *B29K 2105/04* (2013.01); *B29K 2713/00* (2013.01); *B32B 37/0076* (2013.01); *B32B 37/04* (2013.01); *B32B 2038/008* (2013.01); *B32B 2250/24* (2013.01); *B32B 2437/02* (2013.01)

(58) Field of Classification Search
  CPC ......... B29C 65/62; B29C 65/72; B29C 66/00; B29C 66/43; B29D 35/122; B29D 35/128; B29D 35/14; B29D 35/142; B29D 35/148; B32B 2038/008; B32B 27/00; B32B 27/06; B32B 27/08; B32B 37/00; B32B 37/0076; B32B 37/04
  USPC .. 156/60, 65, 90, 91, 92, 93, 145, 146, 147, 156/156, 285, 287, 292, 303.1, 308.2, 156/308.4, 309.6, 313; 36/29; 5/706, 5/707, 709, 710, 644, 645
  See application file for complete search history.

(56) References Cited

U.S. PATENT DOCUMENTS

| | | | |
|---|---|---|---|
| 4,462,331 | A | 7/1984 | McCrory |
| 4,914,836 | A | 4/1990 | Horovitz |
| 4,999,931 | A | 3/1991 | Vermeulen |
| 5,022,109 | A | 6/1991 | Pekar |
| 5,083,361 | A | 1/1992 | Rudy |
| 5,118,555 | A | 6/1992 | Horovitz |
| 5,475,904 | A | 12/1995 | Le Roy |
| 5,731,052 | A | 3/1998 | Gancedo |
| 6,098,313 | A | 8/2000 | Skaja |
| 6,385,864 | B1 | 5/2002 | Sell, Jr. et al. |
| 6,402,879 | B1 | 6/2002 | Tawney et al. |
| 6,519,797 | B1 | 2/2003 | Brubaker et al. |
| 6,837,951 | B2 | 1/2005 | Rapaport |
| 7,254,853 | B1 | 8/2007 | Kim |
| 7,451,554 | B2 | 11/2008 | Hazenberg et al. |
| 2002/0121031 | A1 | 9/2002 | Smith et al. |
| 2003/0097767 | A1 | 5/2003 | Perkinson |
| 2006/0086003 | A1 | 4/2006 | Tseng |
| 2009/0239006 | A1* | 9/2009 | Liao ................. B29C 65/02 428/34.1 |
| 2010/0107444 | A1 | 5/2010 | Aveni et al. |
| 2011/0247744 | A1* | 10/2011 | Turner ............... A41D 31/005 156/163 |

FOREIGN PATENT DOCUMENTS

| | | |
|---|---|---|
| CN | 102202536 A | 9/2011 |
| EP | 0755775 A1 | 1/1997 |

OTHER PUBLICATIONS

State Intellectual Property Office, First Office Action for CN Application No. 201480014409.7, dated May 30, 2016.
State Intellectual Property Office, Second Office Action for CN Application No. 201480014409.7, dated Feb. 14, 2017.

* cited by examiner

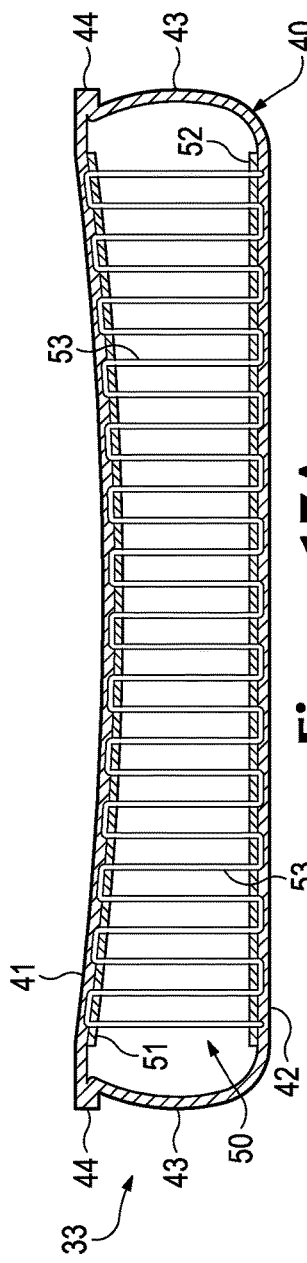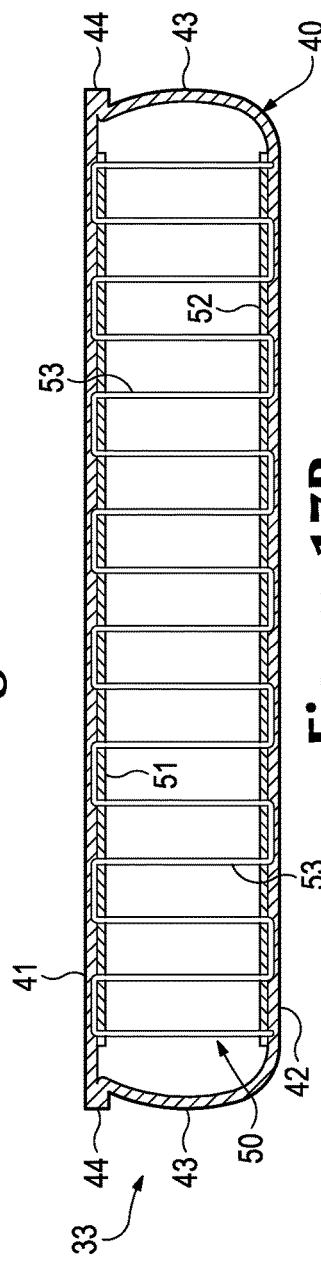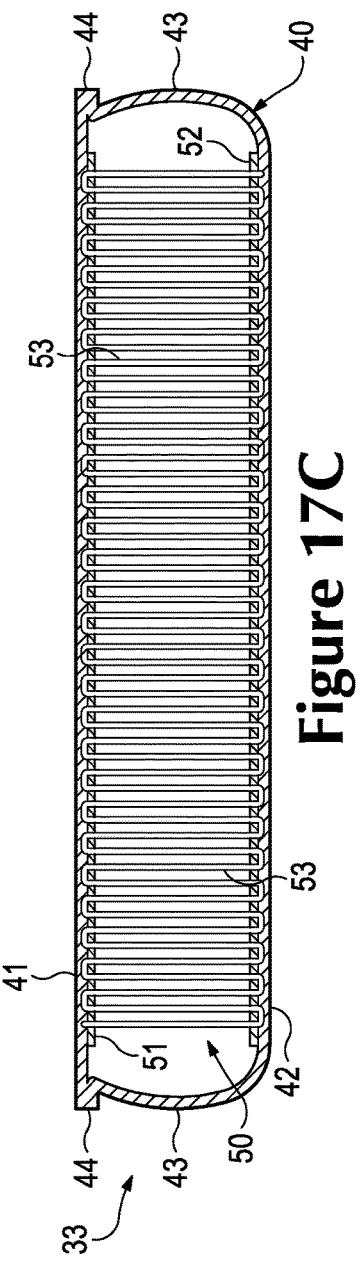
Figure 17A
Figure 17B
Figure 17C

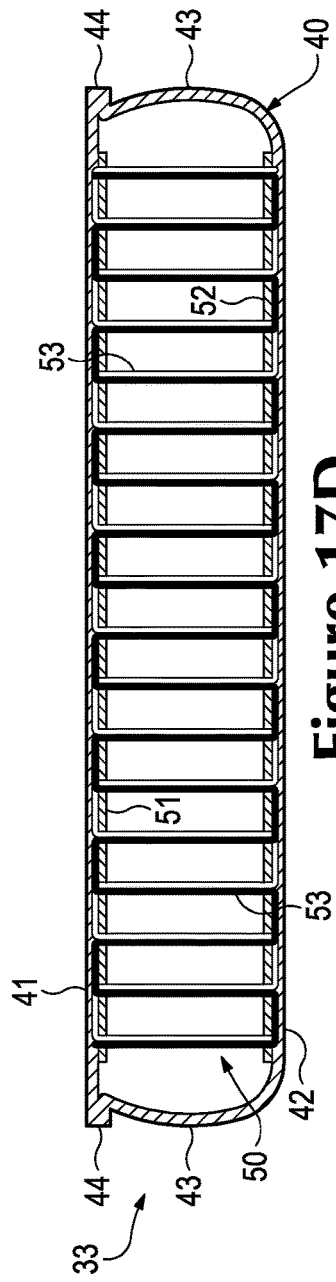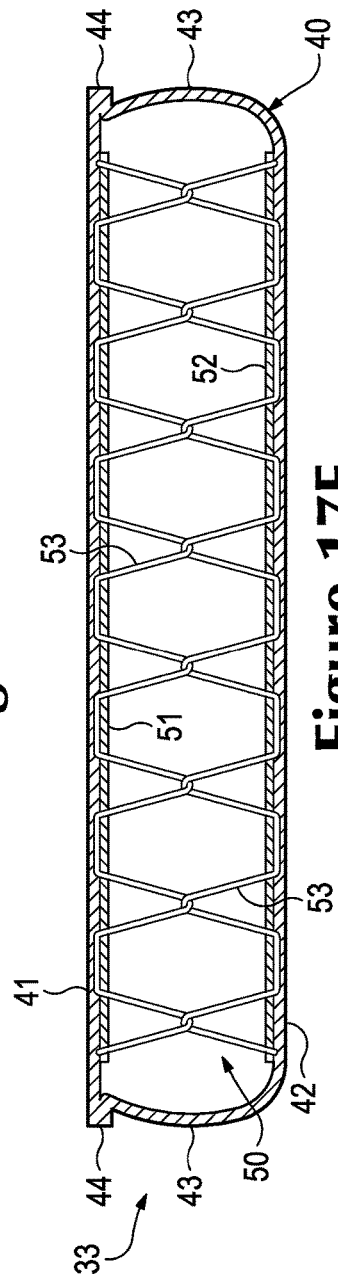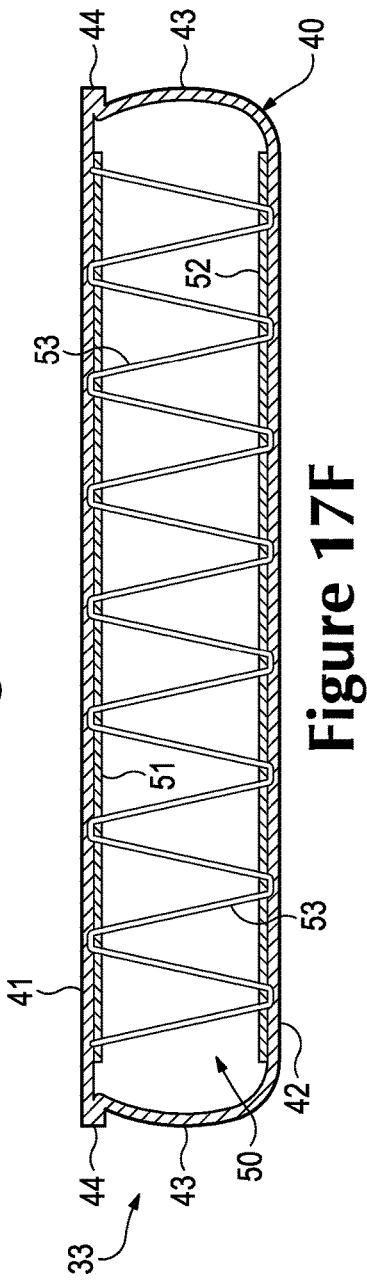

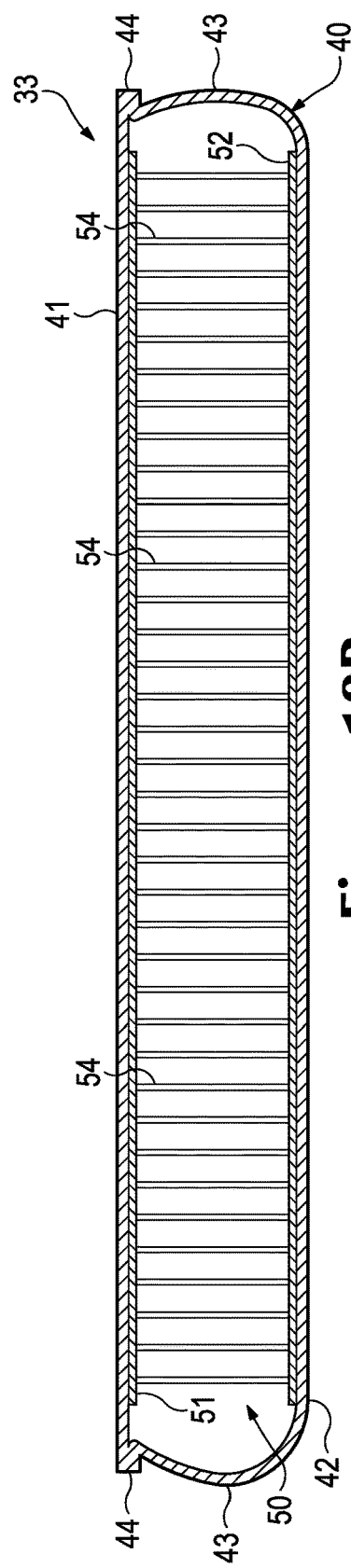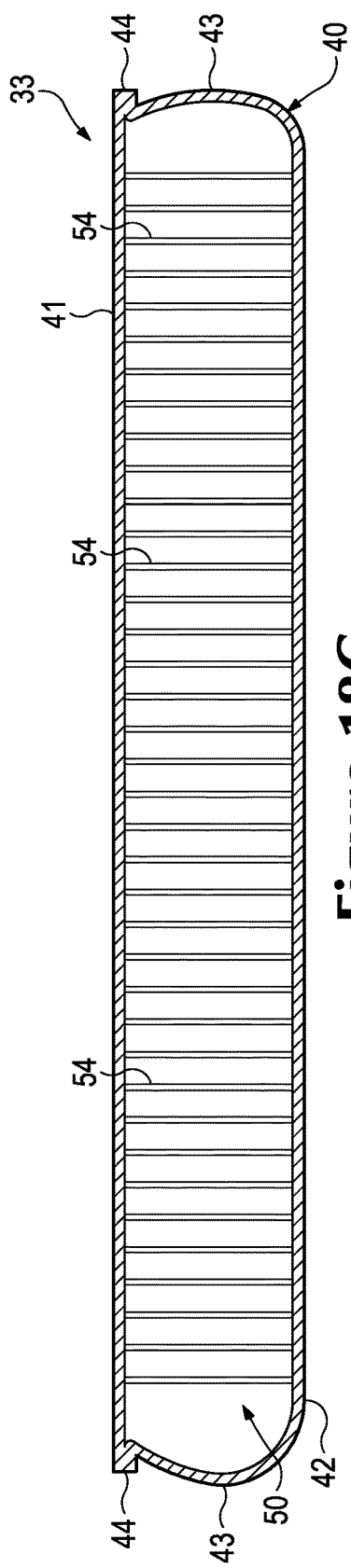

METHOD OF MANUFACTURING A FLUID-FILLED CHAMBER WITH A TENSILE ELEMENT

CROSS-REFERENCE TO RELATED APPLICATIONS

This application is a Continuation of U.S. patent application Ser. No. 13/839,747, filed Mar. 15, 2013, the entire contents of which are incorporated herein by reference.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure generally incorporates an insole, a midsole, and an outsole. The insole, which may be located within the void and adjacent to a lower surface of the void, is a thin compressible member that enhances footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms at least part of the ground-contacting portion of the footwear and is usually fashioned from a durable and wear-resistant material that includes texturing to improve traction.

Generally, the midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and the outsole, may be embedded within the midsole, or may be encapsulated by the foamed polymer material of the midsole, for example. Although many midsoles are primarily formed from a foamed polymer material, fluid-filled chambers or other non-foam structures may form part of or a majority of some midsole configurations.

Various techniques may be utilized to form fluid-filled chambers for articles of footwear or other products, including a two-film technique, a thermoforming technique, and a blowmolding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blowmolding technique, a parison formed from a molten or otherwise softened polymer material is placed within a mold having a cavity with the desired configuration of the chamber. Pressurized air induces the polymer material to conform to surfaces of the cavity. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

SUMMARY

Various features of fluid-filled chambers and methods of manufacturing fluid-filled chambers are disclosed below. In one configuration, a method of manufacturing a fluid-filled chamber comprises steps of stacking, stitching, positioning, securing, and pressurizing. In one step, the method includes stacking a first material layer, a second material layer, and a spacing structure having a plurality of support portions. In another step, the method includes stitching between the support portions with a strand to join the first material layer to the second material layer and to form a tensile element from the first material layer, the second material layer, and the strand. In another step, the method includes positioning the tensile element within an outer barrier. In another step, the method includes securing the first material layer and the second material layer to opposite interior surfaces of the outer barrier. In another step, the method includes pressurizing the outer barrier to place the strand in tension.

In another configuration, a method of manufacturing a fluid-filled chamber comprises steps of locating, stitching, positioning, heating and compressing, sealing, and pressurizing. In one step, the method includes locating a spacing structure between a first material layer and a second material layer, the spacing structure having a plurality of support portions separated by a plurality of gaps. In another step, the method includes stitching through the gaps with at least one strand to join the first material layer to the second material layer and to form a tensile element from the first material layer, the second material layer, and the strand. The tensile element has a plurality of segments of the strand that extend between the first material layer and the second material layer. In another step, the method includes positioning the tensile element between a first polymer sheet and a second polymer sheet. In another step, the method includes heating and compressing the first polymer sheet and the second polymer sheet to secure the first polymer sheet to the first material layer and to secure the second polymer sheet to the second material layer. In another step, the method includes sealing the first polymer sheet to the second polymer sheet to create a peripheral bond and an interior void. In another step, the method includes pressurizing the interior void to place the segments of the strand in tension.

In a further configuration, a method of manufacturing a fluid-filled chamber comprises steps of locating, stitching, removing, spacing, incorporating, and pressurizing. In one step, the method includes locating a first material layer between a spacing structure and a second material layer, the first material layer being in contact with the second material layer, and the spacing structure having a plurality of support portions. In another step, the method includes stitching with at least one strand both between the support portions and over at least one support portion to join the first material layer to the second material layer and to form a tensile element from the first material layer, the second material layer, and the strand. In another step, the method includes removing the spacing structure. In another step, the method includes spacing the first material layer from the second material layer to position a plurality of segments of the strand to extend between the first material layer and the second material layer. In another step, the method includes incorporating the tensile element into an interior void of a barrier. In another step, the method includes pressurizing the interior void of the barrier to place the segments of the strand in tension.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 17A-17G are cross-sectional views corresponding with FIG. 8A and depicting additional configurations of the chamber.

FIGS. 18A-18C are cross-sectional views corresponding with FIG. 8C and depicting additional configurations of the chamber.

DETAILED DESCRIPTION

The following discussion and accompanying figures disclose various configurations of fluid-filled chambers with tensile elements and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
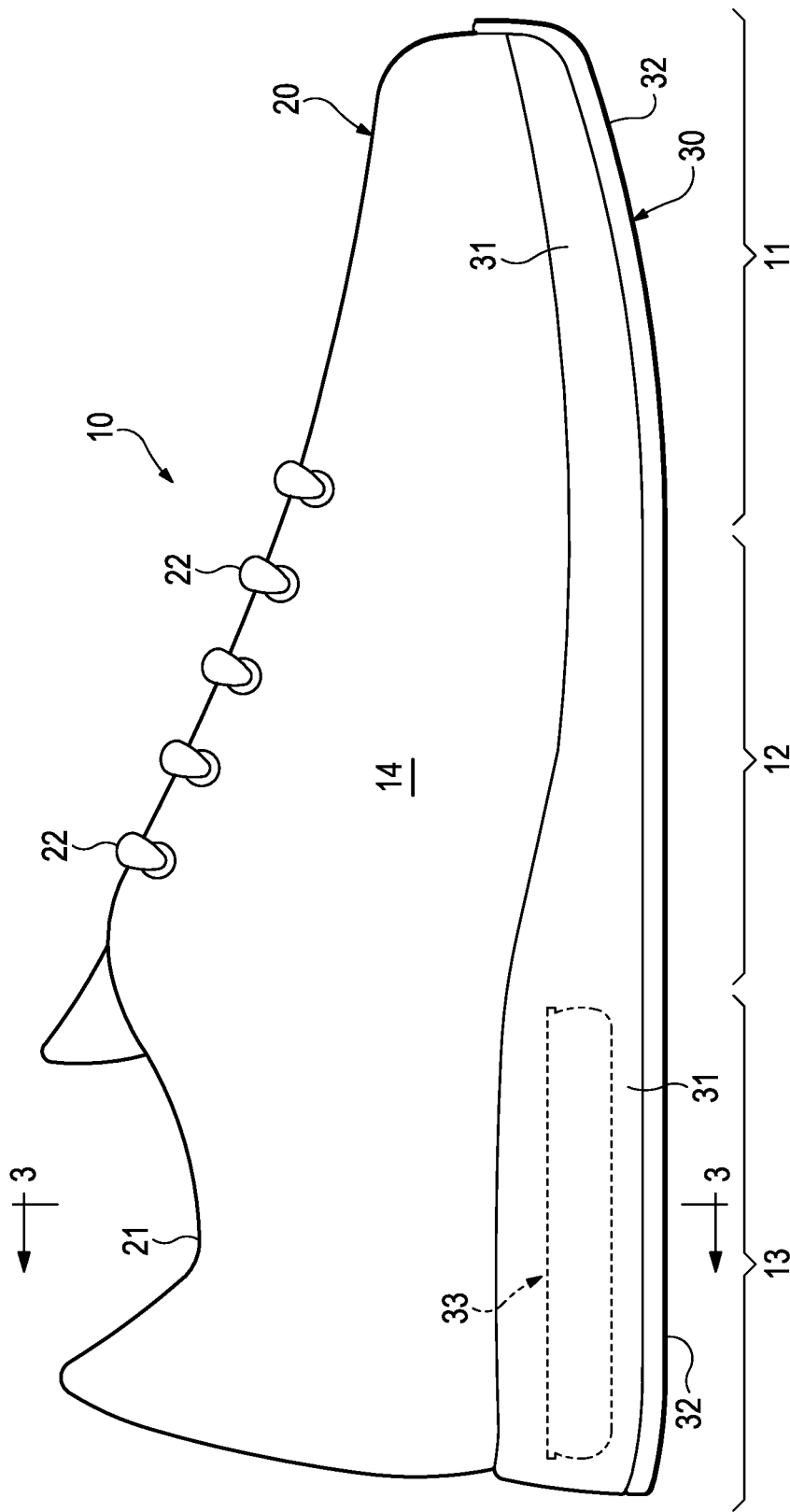
FIG. 1 is a lateral side elevational view of an article of footwear incorporating a fluid-filled chamber.
Figure 2:
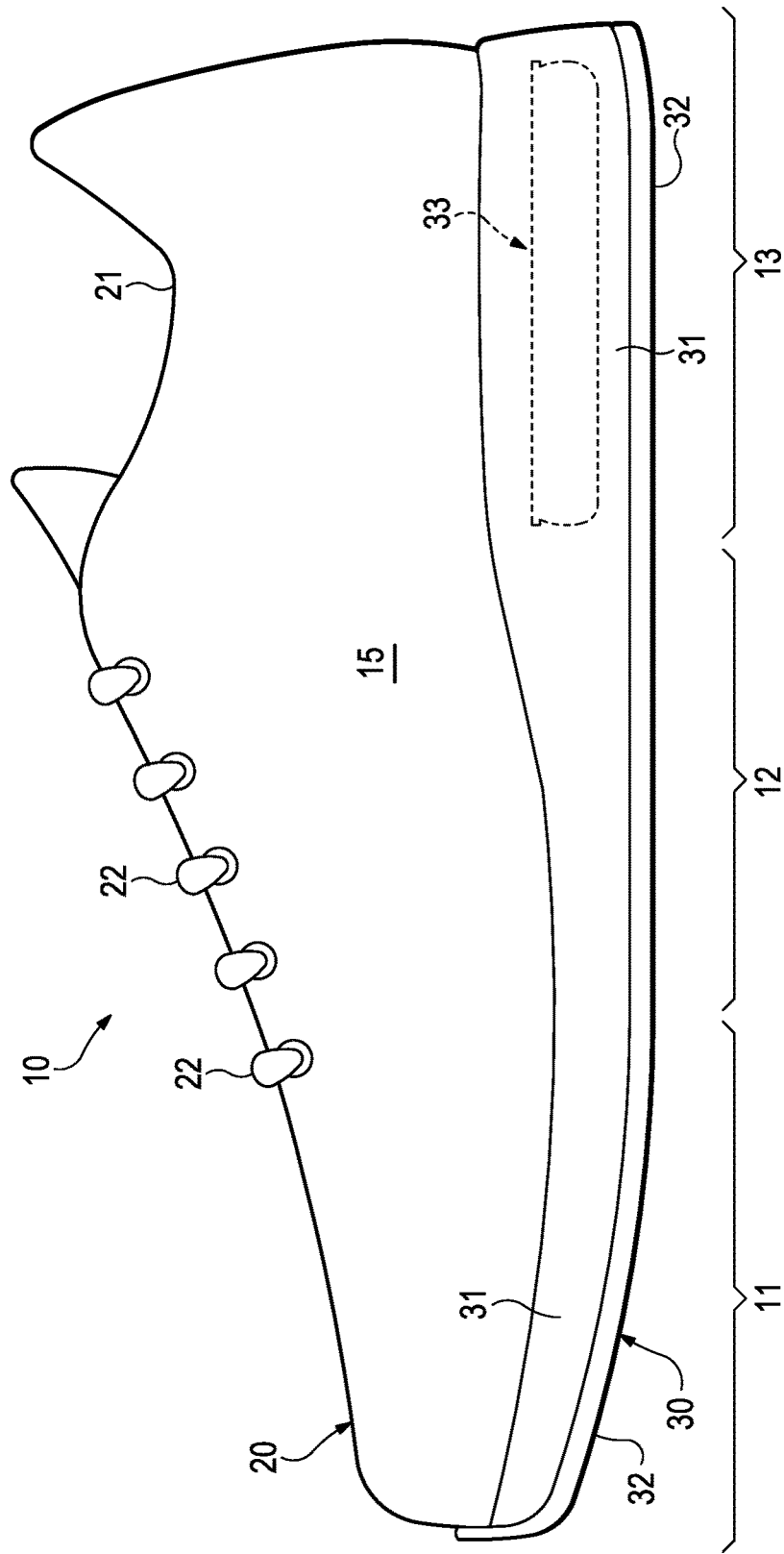
FIG. 2 is a medial side elevational view of the article of footwear.
Figure 3:
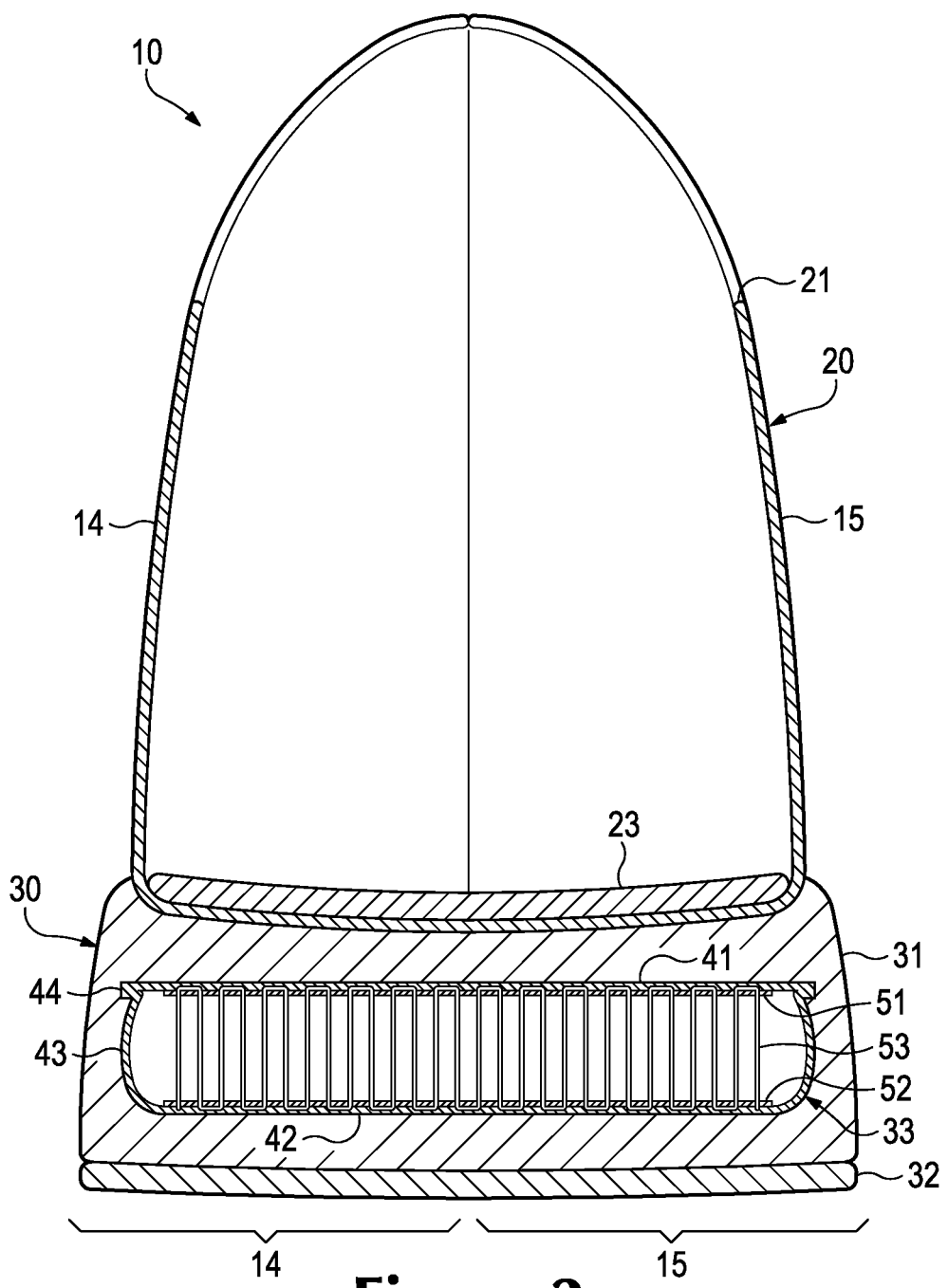
FIG. 3 is a cross-sectional view of the article of footwear, as defined by section line 3 in FIG. 1.
Figure 4:
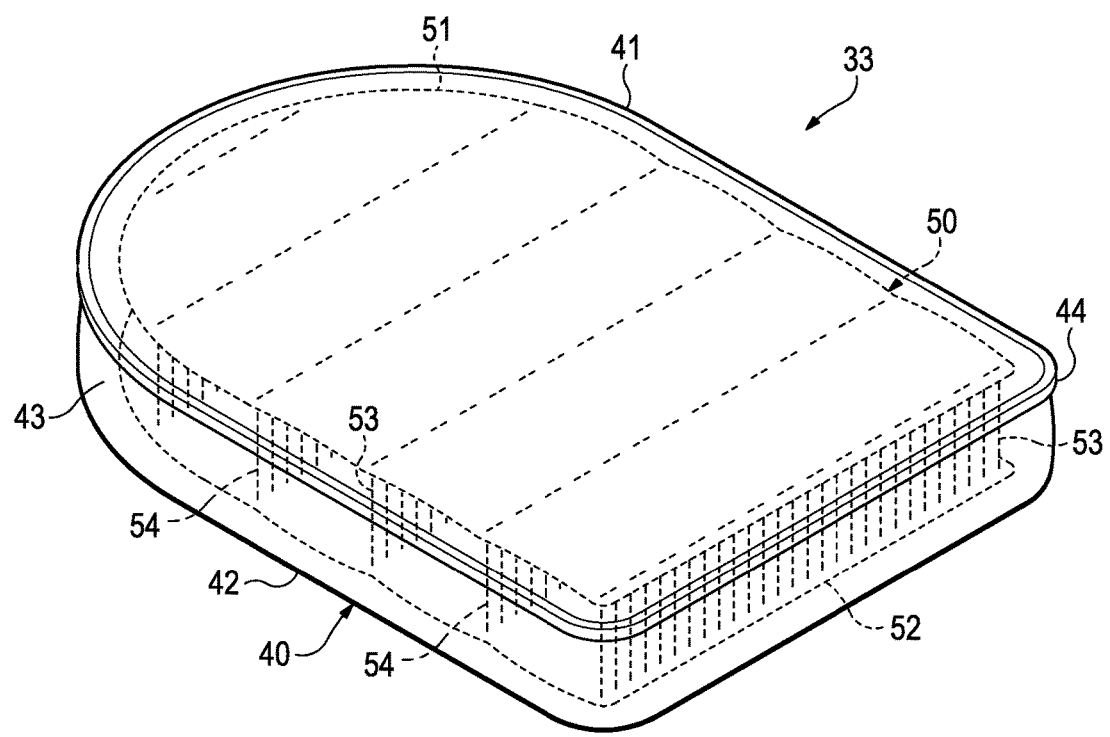
FIG. 4 is a perspective view of the chamber.
Figure 5:
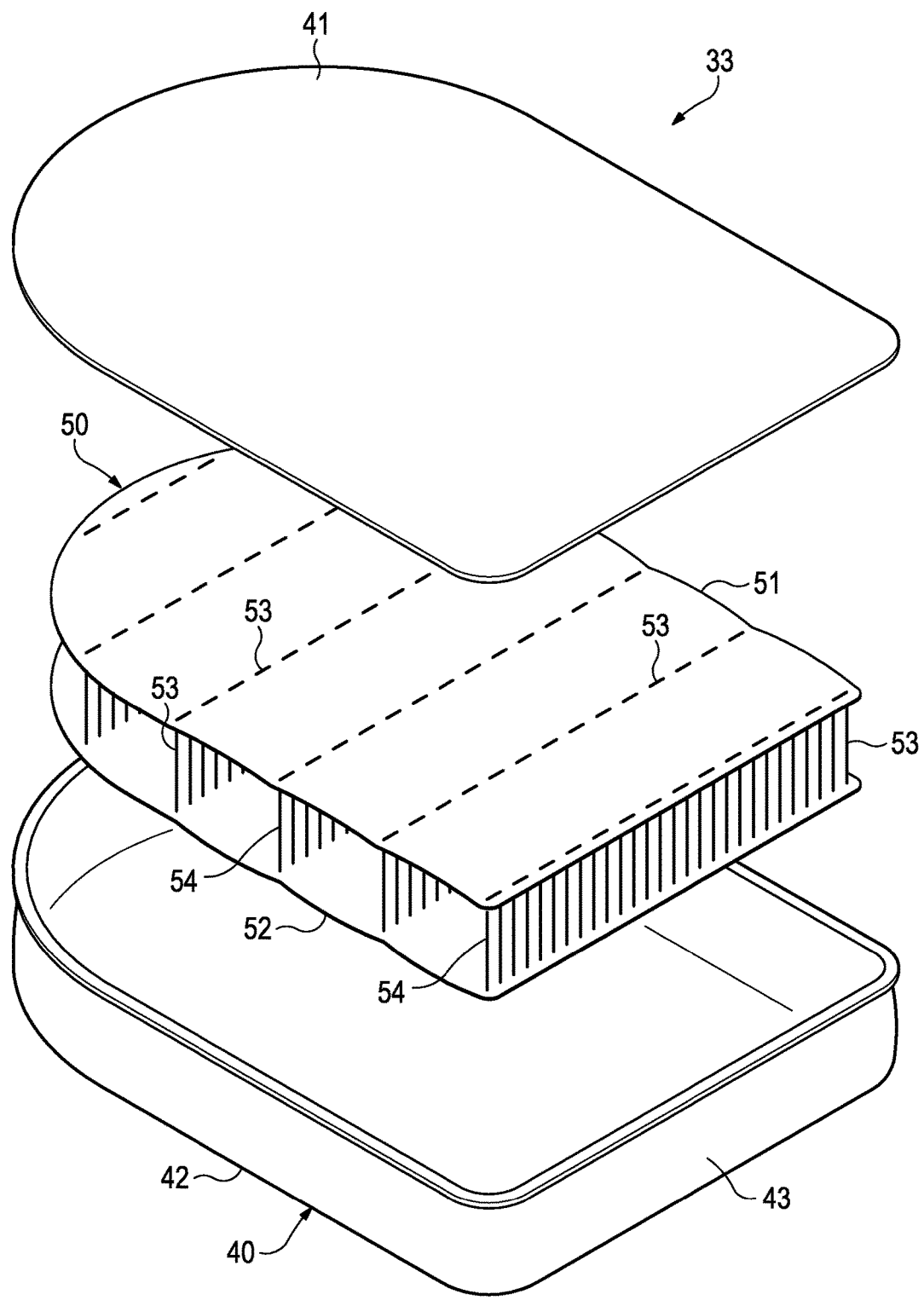
FIG. 5 is an exploded perspective view of the chamber.
Figure 6:
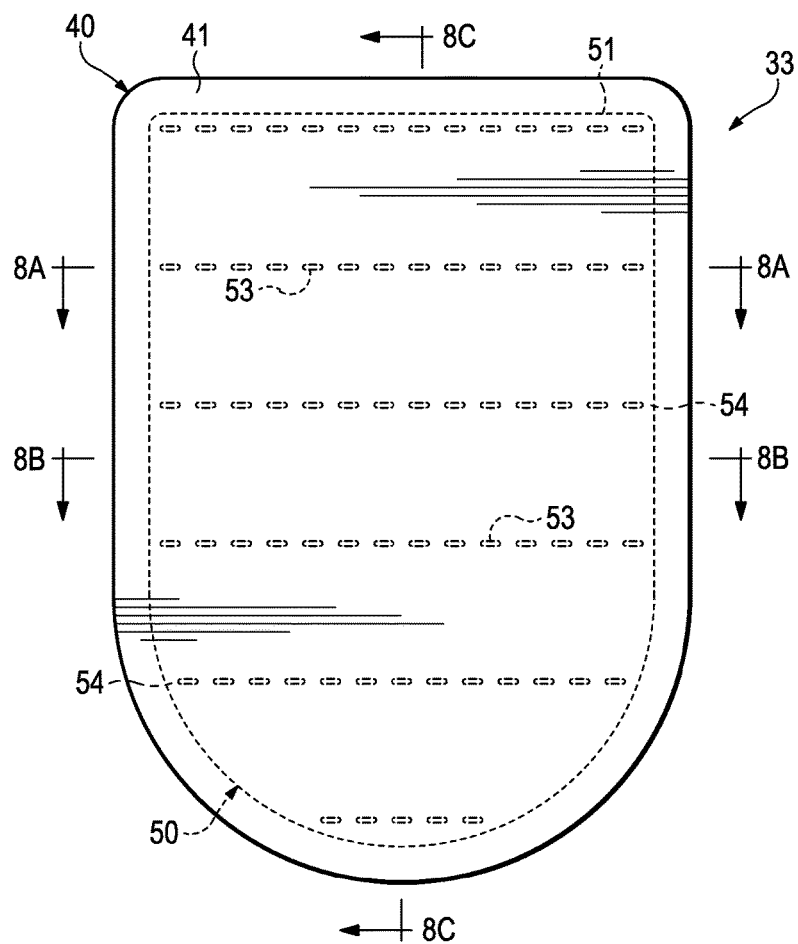
FIG. 6 is a top plan view of the chamber.
Figure 7:
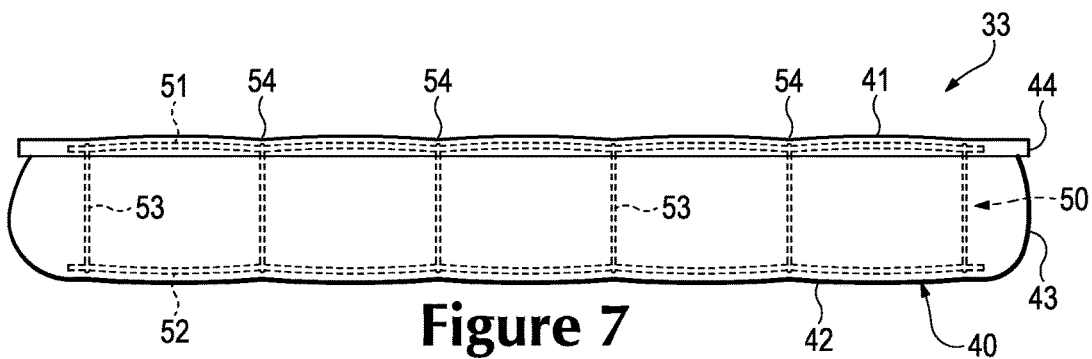
FIG. 7 is a lateral side elevational view of the chamber.
Figure 8A:
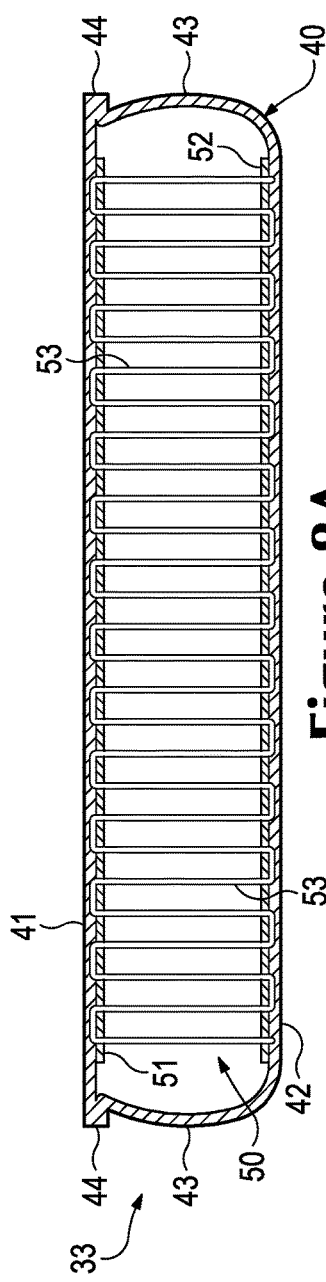
FIGS. 8A-8C are cross-sectional views of the fluid-filled chamber, as respectively defined by section lines 8A-8C in FIG. 6.
Figure 8B:
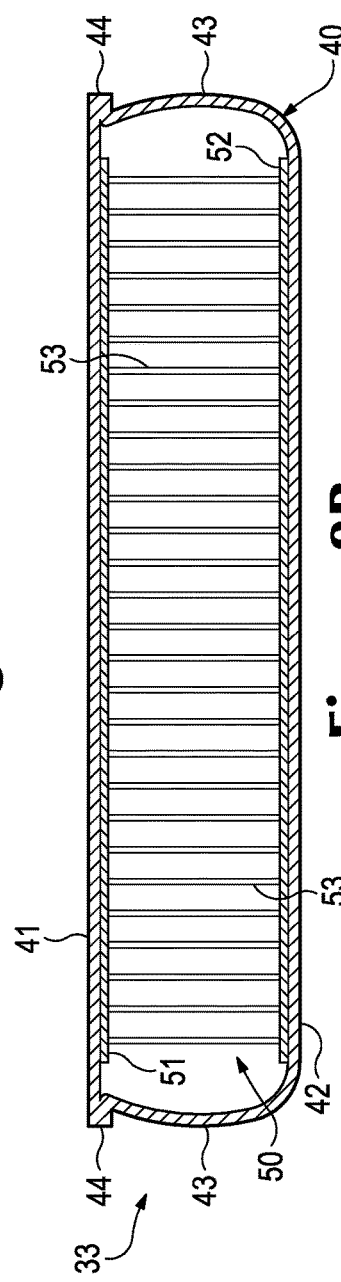
Figure 8C:
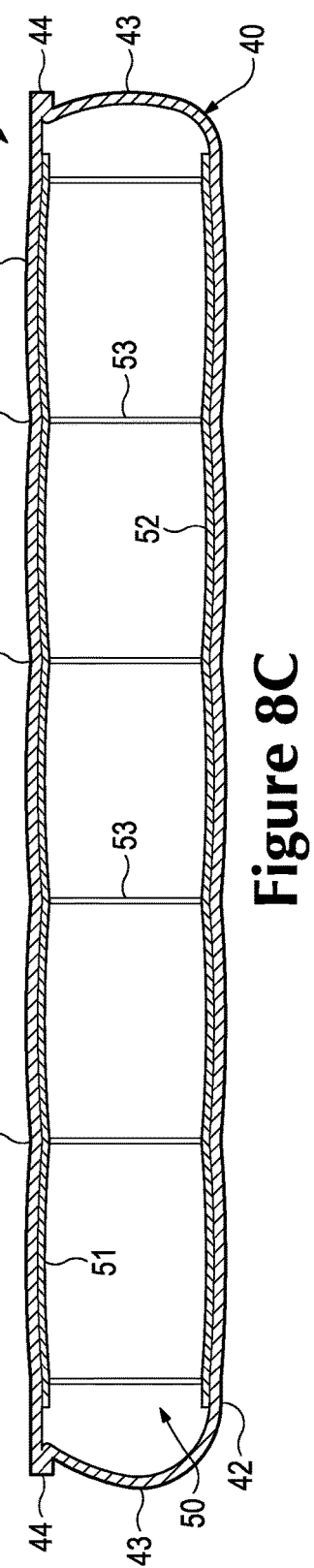

An article of footwear 10 is depicted in FIGS. 1-3 as including an upper 20 and a sole structure 30. For reference purposes, footwear 10 may be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone. Regions 11-13 are not intended to demarcate precise areas of footwear 10. Rather, regions 11-13 are intended to represent general areas of footwear 10 to aid in the following discussion. In addition to being applied to footwear 10, regions 11-13 may also be applied to upper 20, sole structure 30, and individual elements thereof.

Footwear 10 also includes a lateral side 14 and a medial side 15. More particularly, lateral side 14 corresponds with an outside area of the foot (i.e. the surface that faces away from the other foot), and medial side 15 corresponds with an inside area of the foot (i.e., the surface that faces toward the other foot). Lateral side 14 and medial side 15 also extend through each of regions 11-13 and correspond with opposite sides of footwear 10. As with regions 11-13, sides 14 and 15 represent general areas of footwear 10 to aid in the following discussion, and may also be applied to upper 20, sole structure 30, and individual elements thereof, in addition to being applied to footwear 10.

Upper 20 is depicted as having a substantially conventional configuration incorporating a plurality of material elements (e.g., textile, foam, leather, and synthetic leather) that are stitched, adhered, bonded, or otherwise joined together to form an interior void for securely and comfortably receiving a foot. The material elements may be selected and located with respect to upper 20 in order to selectively impart various properties to upper 20, such as durability, air-permeability, wear-resistance, flexibility, and comfort. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Upper 20 may also incorporate a sockliner 23 that is located within the void in upper 20 and adjacent a plantar (i.e., lower) surface of the foot to enhance the comfort of footwear 10. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is positioned to extend between the foot and the ground. In addition to attenuating ground reaction forces (such as by providing cushioning for the foot), sole structure 30 may provide traction, impart stability, and limit various foot motions, such as pronation. The primary elements of sole structure 30 are a midsole 31 and an outsole 32. Midsole 31 may incorporate a polymer foam material, such as polyurethane or ethylvinylacetate. Midsole 31 may also incorporate a fluid-filled chamber 33. In addition to the polymer foam material and chamber 33, midsole 31 may incorporate one or more other footwear elements that enhance the comfort, performance, or ground reaction force attenuation properties of footwear 10, including plates, moderators, lasting elements, or motion control members.

Outsole 32, which may be absent in some configurations of footwear 10, is depicted as being secured to a lower surface of midsole 31 and forms at least part of a ground-contacting surface of footwear 10. Outsole 32 may be formed from a rubber material that provides a durable and wear-resistant surface for engaging the ground. In addition, outsole 32 may also be textured to enhance the traction (i.e., friction) properties between footwear 10 and the ground. In various other configurations of footwear 10, and depending upon the manner in which midsole 31 incorporates the polymer foam material, chamber 33, or both, outsole 32 may be secured to the polymer foam material alone, to chamber 33 alone, or to both the polymer foam material and chamber 33. In some configurations, outsole 32 may be absent from footwear 10.

Chamber 33 is depicted as having a shape that fits within a perimeter of midsole 31 and is depicted as being primarily located in heel region 13. Accordingly, when the foot is located within upper 20, chamber 33 extends under a heel area of the foot (for example, under a calcaneus bone of the wearer) in order to attenuate ground reaction forces that are generated when sole structure 30 is compressed between the foot and the ground during various ambulatory activities, such as running and walking. In various other configurations, chamber 33 may extend through alternate portions of footwear 10. For example, chamber 33 may extend only through forefoot region 11, or only through midfoot region 12, or through substantially all of footwear 10 (i.e., from forefoot region 11 to heel region 13 and also from lateral side 14 to medial side 15). Alternatively, chamber 33 may extend only through lateral side 14 of footwear 10, or only through medial side 15 of footwear 10. Chamber 33 may also extend through any combination of regions and sides. In other words, in various configurations, chamber 33 may extend through any portion or portions of footwear 10.

Chamber 33 is also depicted as being substantially surrounded by or entirely encapsulated within a polymer foam material of midsole 31 and secured to the polymer foam material. In various other configurations of footwear 10, however, midsole 31 may otherwise incorporate chamber 33. For example, chamber 33 may be partially encapsulated within the polymer foam material of midsole 31, or may be above the polymer foam material, or may be below the polymer foam material, or may be between layers or regions of one or more polymer foam materials. As an example, portions of chamber 33 may form an upper or lower surface of midsole 31. In some configurations, the polymer foam material of midsole 31 may be absent and chamber 33 may be secured to both upper 20 and outsole 32.

Moreover, while a sidewall of midsole 31 is depicted as being formed substantially entirely by the polymer foam material of midsole 31, the sidewall may be otherwise formed in various other configurations of footwear 10. For example, the sidewall of midsole 31 may be formed partially by the polymer foam material of midsole 31 and partially by portions of chamber 33. That is, one or more portions of chamber 33 may be exposed on sides 14 and 15 to form one or more portions of the sidewall. In further configurations, the sidewall of midsole 31 may be substantially entirely formed by exposed portions of chamber 33.

Additionally, in various configurations, chamber 33 may contact or be secured to one or more other footwear elements within midsole 31, such as plates, moderators, lasting elements, or motion control members. Accordingly, the overall shape of chamber 33 and the manner in which chamber 33 is incorporated into footwear 10 may vary significantly.

Furthermore, although chamber 33 is depicted and discussed as being a sealed chamber within footwear 10, chamber 33 may also be a component of a fluid system within footwear 10. More particularly, pumps, conduits, and valves may be joined with chamber 33 to provide a fluid system that pressurizes chamber 33 with air from the exterior of footwear 10 or a reservoir within footwear 10. In some configurations, chamber 33 may incorporate a valve or other structure that permits an individual, such as a wearer, to adjust the pressure of the fluid. As examples, chamber 33 may be utilized in combination with any of the fluid systems disclosed in U.S. Pat. No. 7,210,249 to Passke, et al. and U.S. Pat. No. 7,409,779 to Dojan, et al, including fluid systems that vary the pressure within chamber 33 depending upon, for example, the running style or weight of the wearer.

Chamber Configuration

Chamber 33 is depicted individually in FIGS. 4-8C as having a substantially flat configuration that is suitable for footwear applications. The primary elements of chamber 33 are a barrier 40 and a tensile element 50.

Barrier 40 (a) forms an exterior of chamber 33, (b) defines an interior void that receives both a pressurized fluid and tensile element 50, and (c) provides a durable sealed barrier for retaining the pressurized fluid within chamber 33. An exterior surface of barrier 40 forms an outer surface of chamber 33, and an interior surface of barrier 40 defines the interior void. The polymer material of barrier 40 includes (a) a first barrier portion 41 oriented toward upper 20, which may form an upper portion of barrier 40, and (b) an opposite second barrier portion 42 oriented toward outsole 32, which may form a lower portion of barrier 40. Barrier 40 also includes a peripheral edge 43 that extends around a periphery of chamber 33 and between barrier portions 41 and 42, and a peripheral bond 44 that joins a periphery of first barrier portion 41 to a periphery of second barrier portion 42.

Tensile element 50 is located within the interior void and between first barrier portion 41 and second barrier portion 42 and is accordingly incorporated into the interior void. Tensile element 50 includes (a) a first material layer 51, which may be an upper layer oriented toward upper 20, (b) an opposite second material layer 52, which may be a lower layer oriented toward the ground, and (c) a plurality of strand segments 53 in a plurality of rows 54. Material layers 51 and 52 are secured to the interior surface of barrier 40. More particularly, first material layer 51 is secured to a part of an interior surface of barrier 40 formed by first barrier portion 41, and second material layer 52 is secured to a part of the interior surface of barrier 40 formed by second barrier portion 42. As discussed in greater detail below, tensile element 50 may be secured to barrier 40 in various ways, including thermobonding, adhesive bonding, or both.

Strand segments 53 are portions of one or more strands (i.e., lengths of material having a generally one-dimensional structure) used to stitch, sew together, or otherwise join first material layer 51 to second material layer 52, as is discussed in greater detail below. Some strand segments 53 extend between material layers 51 and 52, thereby extending across the interior void. Other strand segments 53 extend (a) across a surface of first material layer 51 facing first barrier portion 41, and (b) across a surface of second material layer 52 facing second barrier portion 42. That is, various pluralities of strand segments 53 may extend (a) between first barrier portion 41 and first material layer 51, and (b) between second barrier portion 42 and second material layer 52.

A wide range of polymer materials may be utilized for barrier 40. In selecting materials for barrier 40, engineering properties of the materials (e.g., tensile strength, stretch properties, fatigue characteristics, dynamic modulus, and loss tangent) as well as the ability of the materials to prevent the diffusion of the fluid contained by barrier 40 may be considered. When formed of thermoplastic urethane, for example, barrier 40 may have a thickness of approximately 1.0 millimeter, but the thickness may range from less than 0.25 to more than 2.0 millimeters, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Accordingly, chamber 33 may be formed from various sheets of a polymer material, each of the sheets including multiple layers of different polymer materials. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk, et al.

A variety of processes may be utilized to manufacture chamber 33. In general, the manufacturing processes involve (a) securing a pair of polymer sheets, which form barrier portions 41 and 42 as well as peripheral edge 43, to tensile element 50 and (b) forming peripheral bond 44 to extend around peripheral edge 43 and join the polymer sheets. Peripheral bond 44 is depicted as being adjacent to the upper surface of chamber 33, but in various other configurations it may be positioned between the upper and lower surfaces of chamber 33, or it may be adjacent to the lower surface of chamber 33. The manufacturing process may also position tensile element 50 within chamber 33 and bond tensile element 50 to barrier portions 41 and 42. Although substantially all of the thermoforming process may be performed with a mold, as described in greater detail below, each of the various parts or steps of the process may be performed separately in forming chamber 33. That is, a variety of other methods may be utilized to form chamber 33.

In order to facilitate bonding between tensile element 50 and barrier 40, a supplemental polymer material may be added to or incorporated within tensile element 50. When heated, the supplemental polymer material may soften, melt, or otherwise begin to change state so that contact with barrier portions 41 and 42 induces material from barrier 40 to intermingle or otherwise join with the supplemental polymer material. Upon cooling, therefore, the supplemental polymer material may be permanently joined with barrier 40, thereby joining tensile element 50 with barrier 40. In some configurations, thermoplastic threads or strips may be present within tensile element 50 to facilitate bonding with barrier 40, as disclosed, for example, in U.S. Pat. No. 7,070,845 to Thomas, et al., or an adhesive may be utilized to secure barrier 40 and tensile element 50.

Following the thermoforming process, or as part of the thermoforming process, a fluid may be injected into the interior void and pressurized between zero and three-hundred-fifty kilopascals (i.e., approximately fifty-one pounds per square inch) or more. The pressurized fluid exerts an outward force upon barrier 40, which tends to separate barrier portions 41 and 42. However, tensile element 50, being secured to each of barrier portions 41 and 42, operates to retain the intended shape of chamber 33 when pressurized. More particularly, strand segments 53 extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile element 50 prevents barrier 40 from expanding outward or otherwise distending due to the pressure of the fluid. That is, tensile element 50 effectively limits the expansion of chamber 33 to retain an intended shape of barrier portions 41 and 42.

Tensile Element Manufacturing Process

Figure 9:
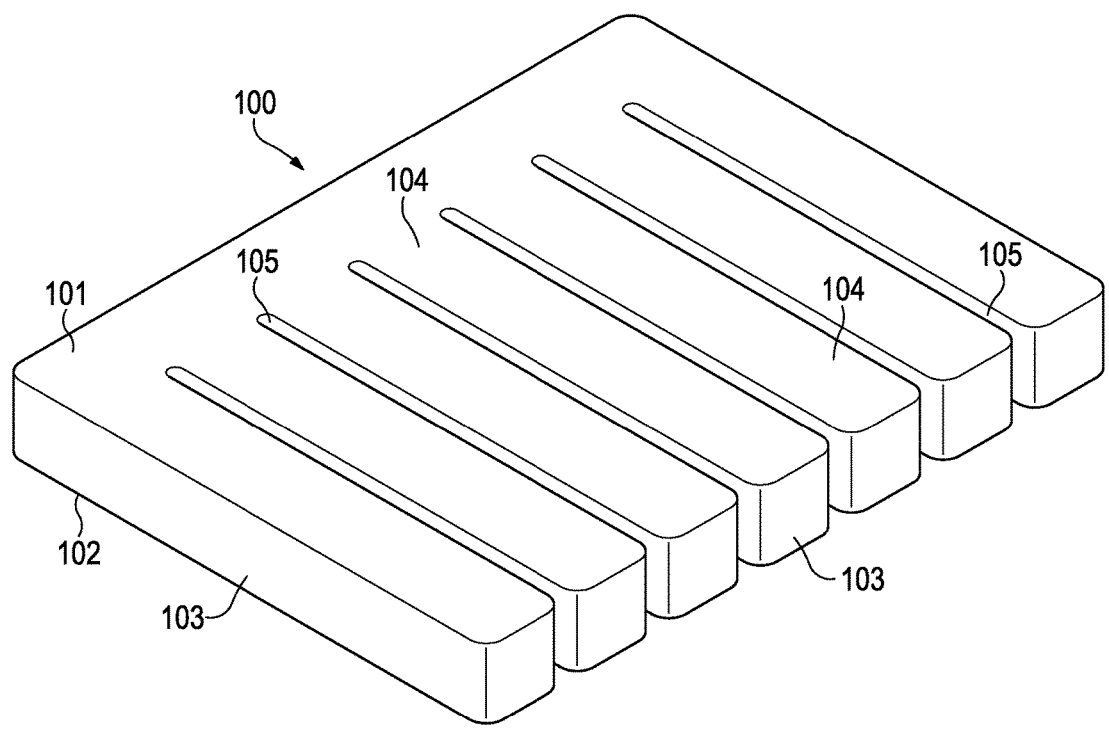
FIG. 9 is a perspective view of a spacing structure used in a process for manufacturing a tensile element.

A variety of manufacturing processes may be utilized to form tensile element 50. FIG. 9 depicts a spacing structure 100 suitable for use in forming tensile element 50. Spacing structure 100 includes a first surface 101, which may be an upper surface, and an opposite second surface 102, which may be a lower surface. In addition, a number of side surfaces 103 that extend between first surface 101 and second surface 102. Spacing structure 100 includes a plurality of support portions 104 separated by a plurality of gaps 105. In some configurations, as depicted in FIG. 9, spacing structure 100 may have a comb-like configuration, with support portions 104 extending in a substantially aligned and parallel direction that resembles the fingers of a comb.

In various manufacturing processes, first material layer 51, second material layer 52, and spacing structure 100 may be stacked. Subsequently, in a stitching step (which may be performed by a sewing or stitching machine, by hand, or by another method of forming stitches), one or more strands of material that form strand segments 53 may be used to join the first material layer to the second material layer, thereby forming tensile element 50 from first material layer 51, second material layer 52, and the strand or strands.

Depending upon the particular manufacturing process, spacing structure 100 may be removed after the stitching step, and first material layer 51 may be spaced from second material layer 52. Once material layers 51 and 52 are spaced from each other, various pluralities of strand segments 53 are positioned throughout tensile element 50. Strand segments 53 are segments of the material strand or strands stitched through material layers 51 and 52. Some strand segments 53 extend between material layers 51 and 52. Other strand segments 53 extend across outwardly-facing surfaces of material layers 51 and 52. Similarly, a plurality of rows 54 of strand segments 53, corresponding with adjacent, contiguous stitches or segments of the same strand, are positioned throughout tensile element 50.

Figure 10A:
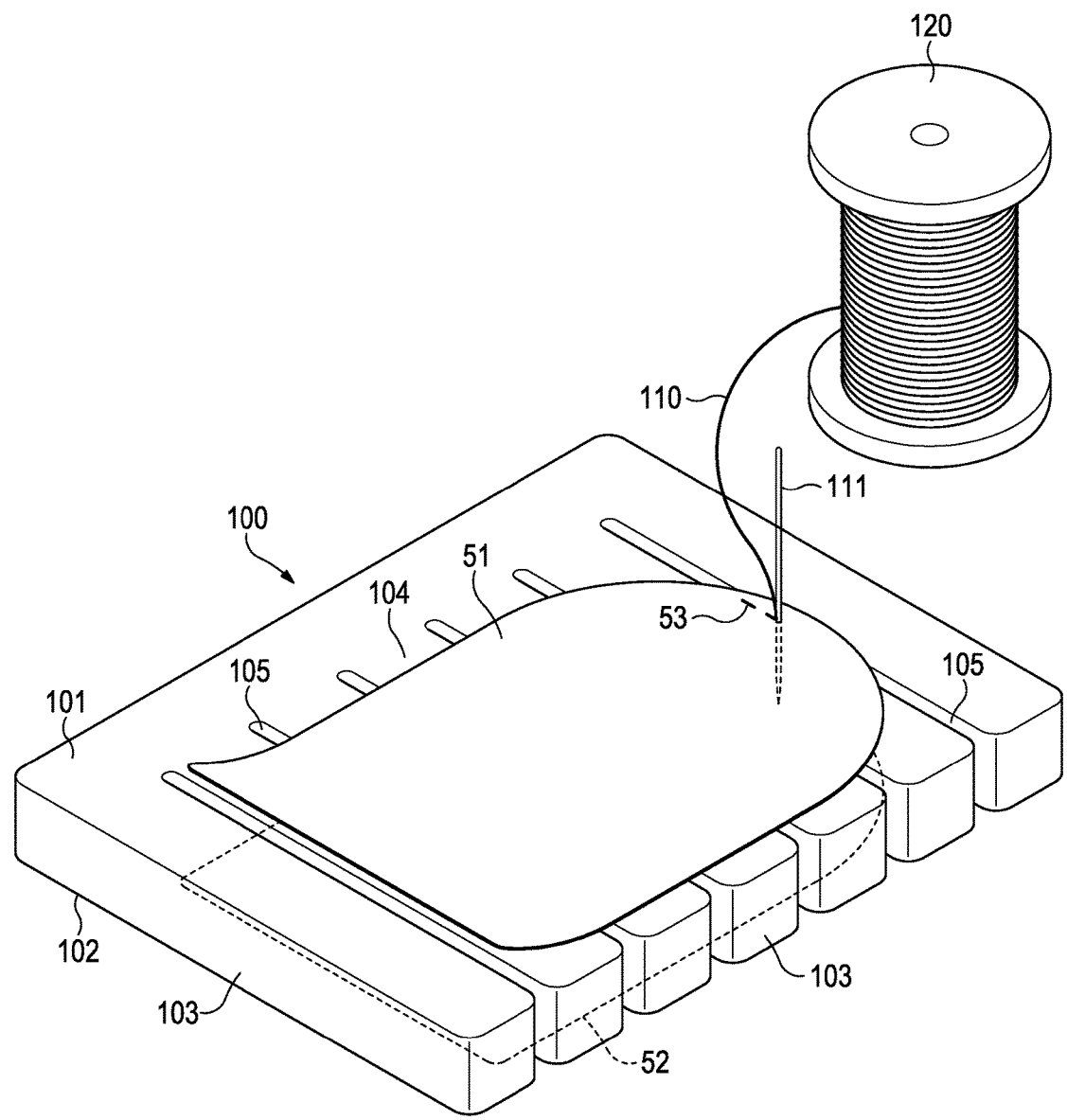
FIGS. 10A-10D are schematic perspective views depicting the process for manufacturing the tensile element.
Figure 10B:
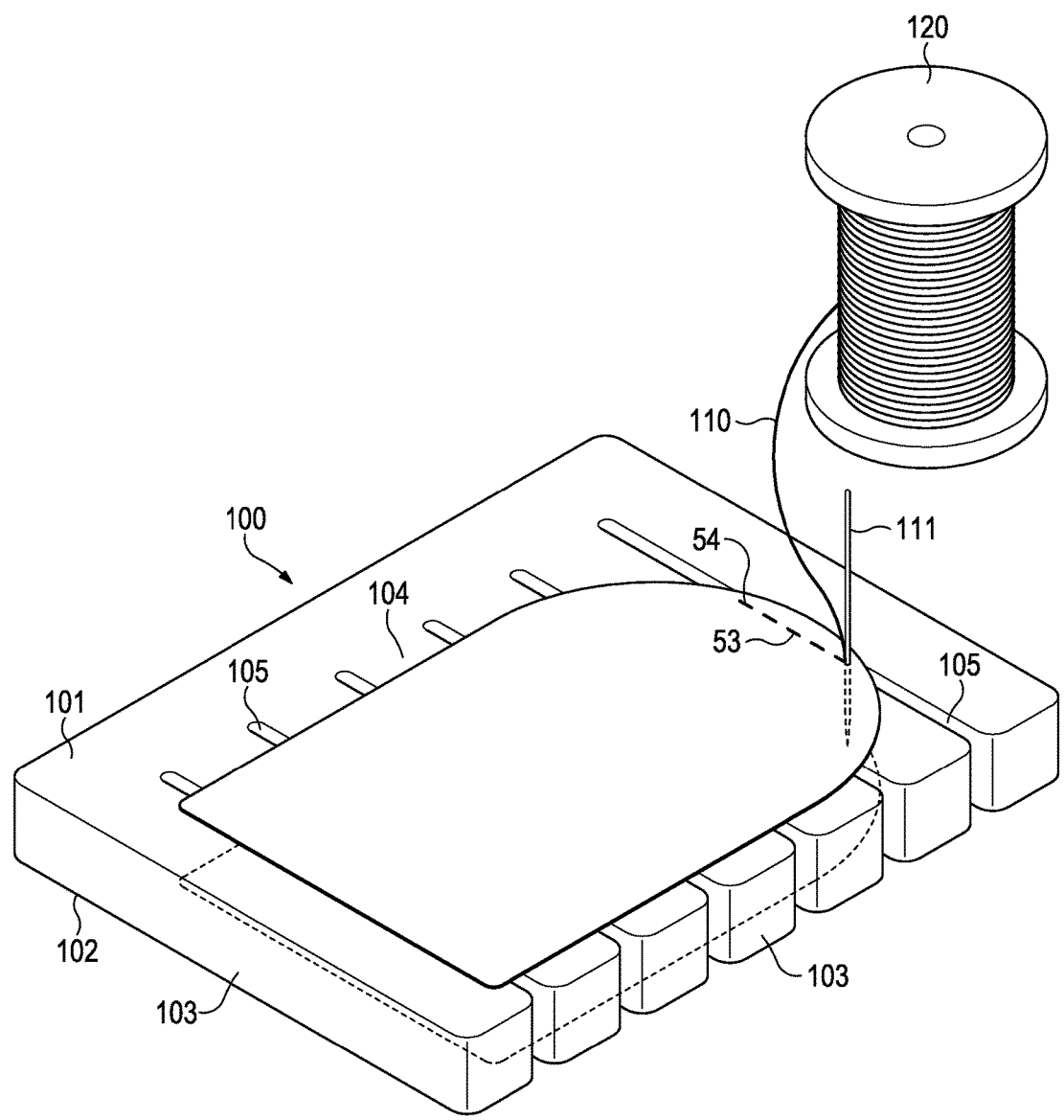

As an example, FIGS. 10A-10D schematically depict steps in a process for manufacturing tensile element 50. As depicted in FIG. 10A, material layers 51 and 52 and spacing structure 100 are stacked such that spacing structure 100 is located between first material layer 51 and second material layer 52. A needle 111 stitches, sews, or otherwise draws a strand 110 from a spool 120, through first material layer 51, through a gap 105 between support portions 104, and through second material layer 52. Strand 110 is then stitched, sewn, or otherwise drawn back through second material layer 52, gap 105, and first material layer 51. Needle 111 is then moved to a nearby position on first material layer 51 and drawn in another loop, course, or stitch back through material layers 51 and 52, and so on, until a row 54 of strand segments 53 extends across tensile element 50, as depicted in FIG. 10B. First material layer 51 and second material layer 52 may accordingly be joined by a row 54 of strand segments 53 or stitches. Although depicted as being stitched in substantially the same direction in which support portions 104 and gaps 105 extend, in other configurations, strand 110 may be stitched in a direction substantially perpendicular to or angled with respect to the direction in which support portions 104 and gaps 105 extend. That is, rows 54 may extend across one or more support portions 104 and through a plurality of gaps 105.

Figure 10C:
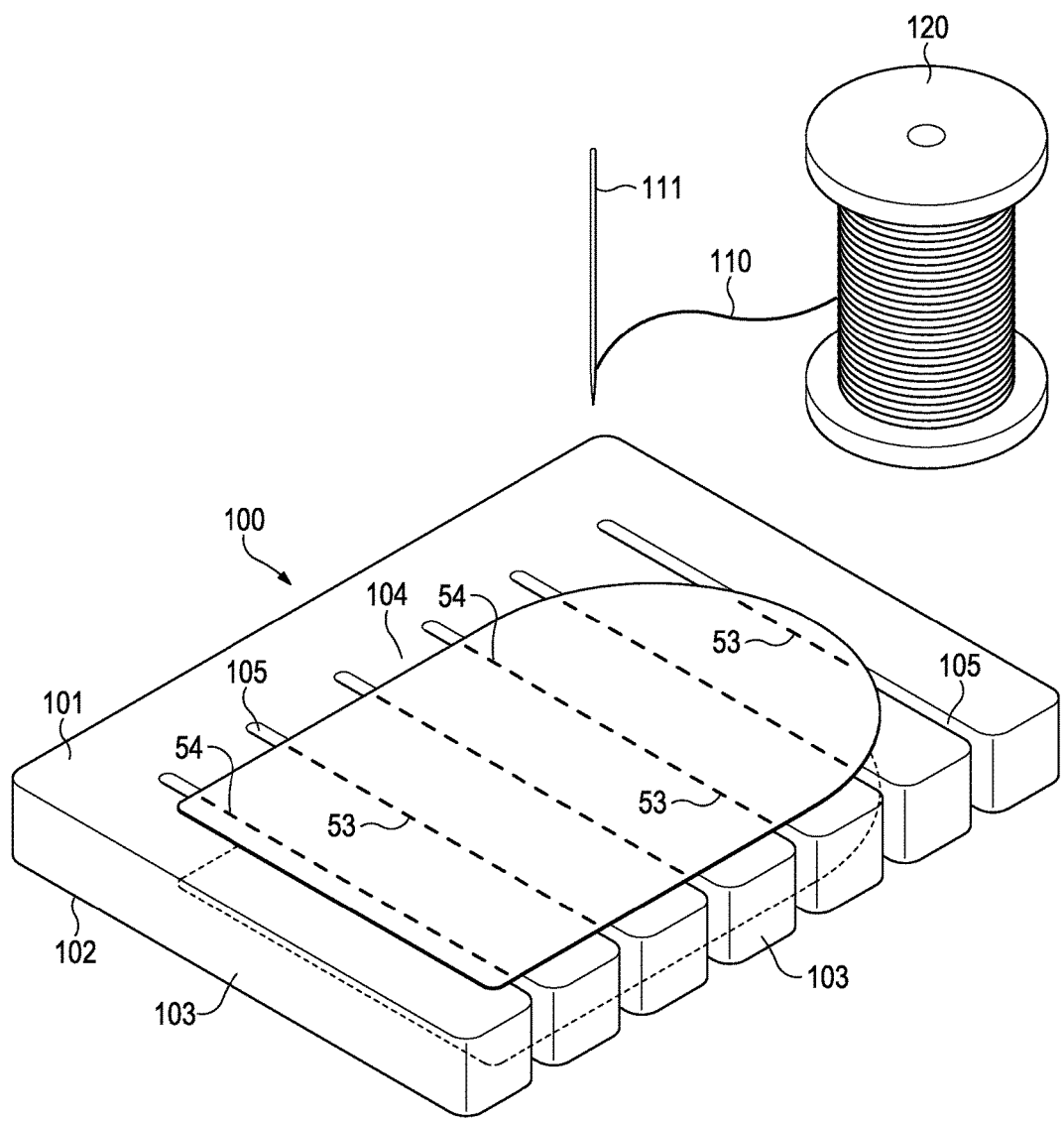
Figure 10D:
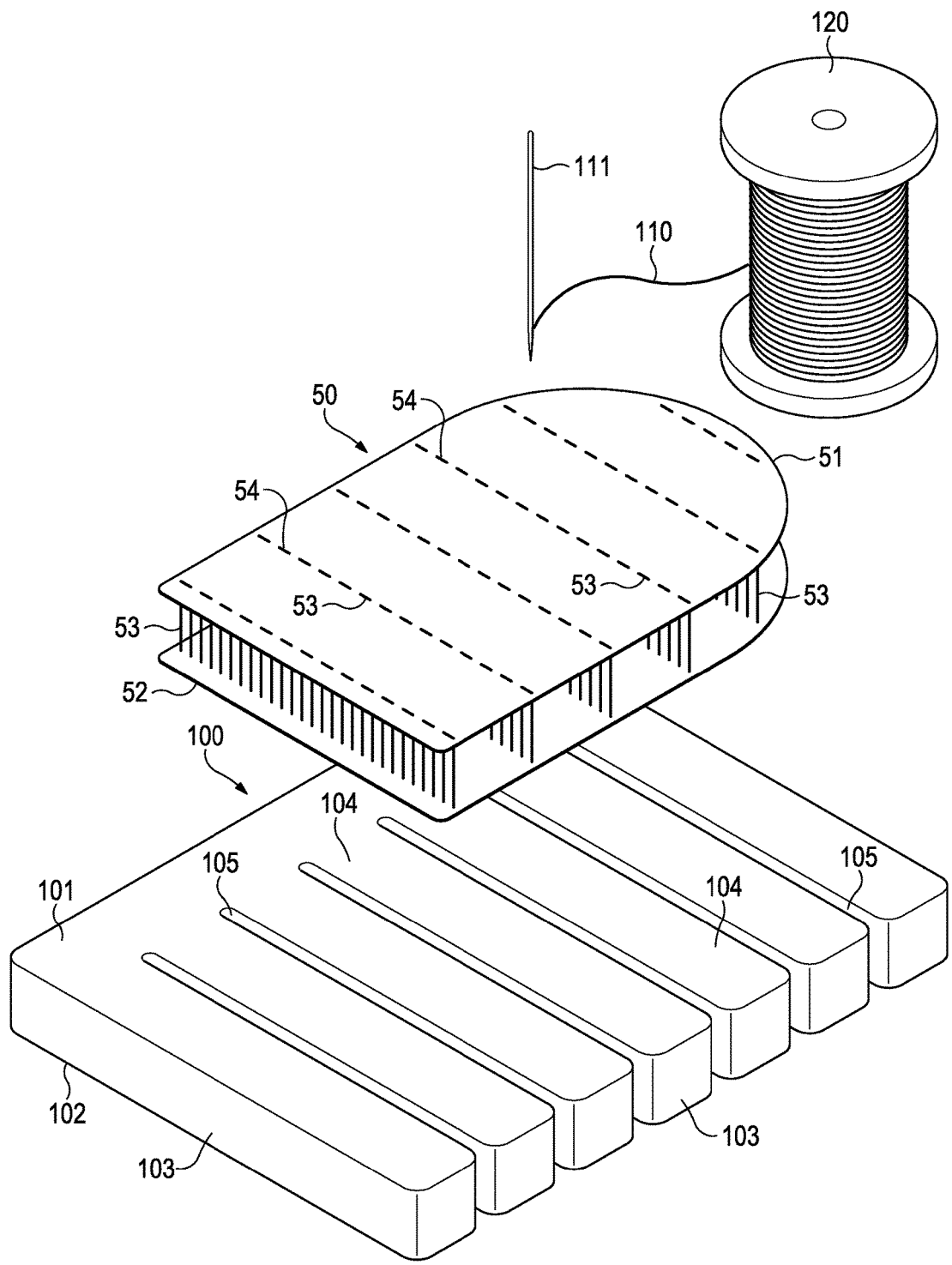

As depicted in FIG. 10C, the stitching of strand 110 has been completed, forming additional rows 54 of strand segments 53 or stitches corresponding with the remaining gaps 105. Rows 54 of strand segments 53 accordingly extend throughout each gap 105. Each of rows 54 may be formed from a separate or distinct portion of strand 110. Alternatively, strand 110 may extend across a support portion 104 at the end of one row 54 and form the beginning of another row 54, such that some or all of rows 54 may be formed from a single, contiguous portion of strand 110. Thereafter, as depicted in FIG. 10D, spacing structure 100 is removed, and tensile element 50 is provided with a plurality of strand segments 53 that extend between material layers 51 and 52.

Figure 11A:
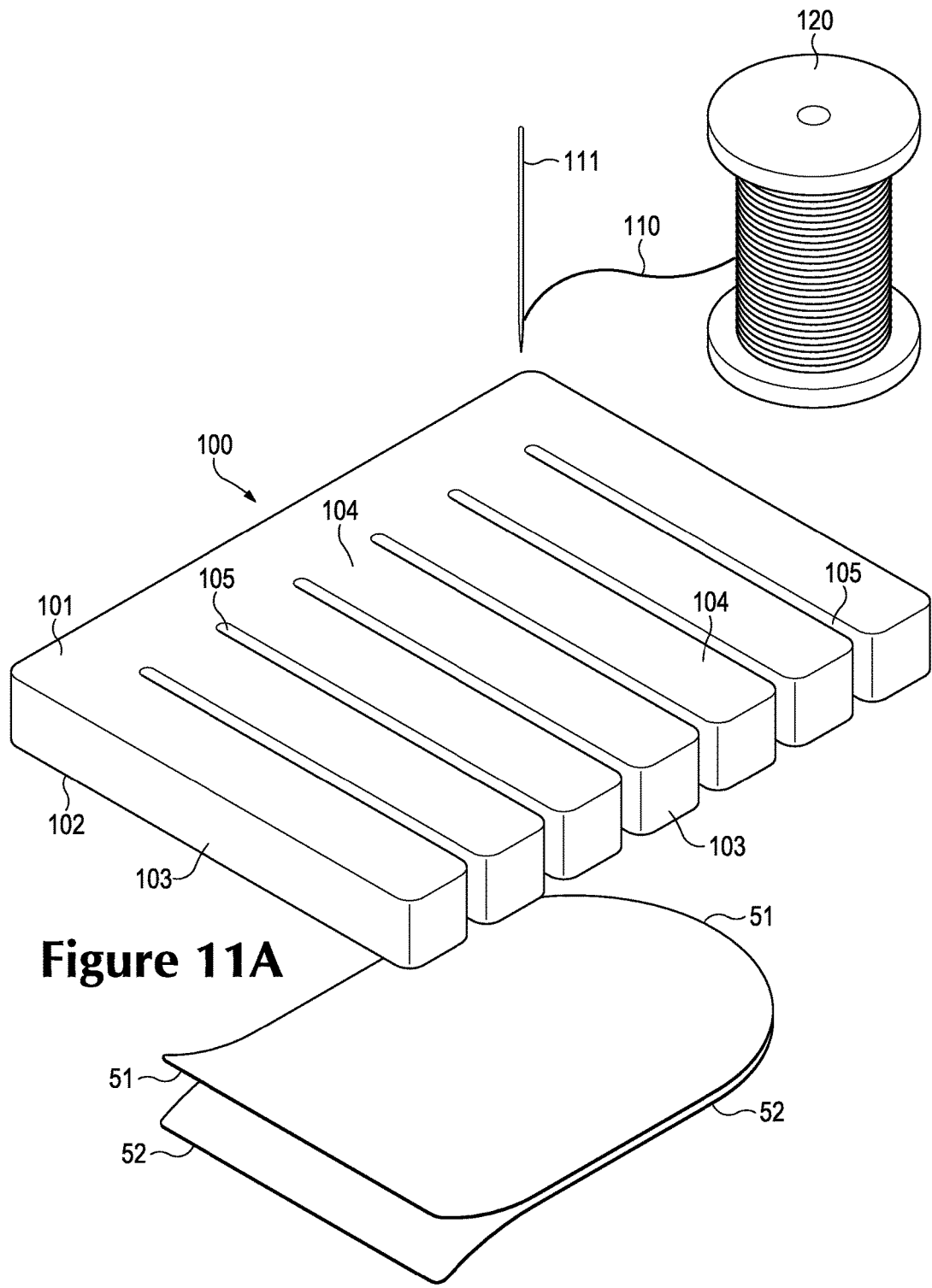
FIGS. 11A-11F are schematic perspective views depicting another process for manufacturing the tensile element.
Figure 11B:
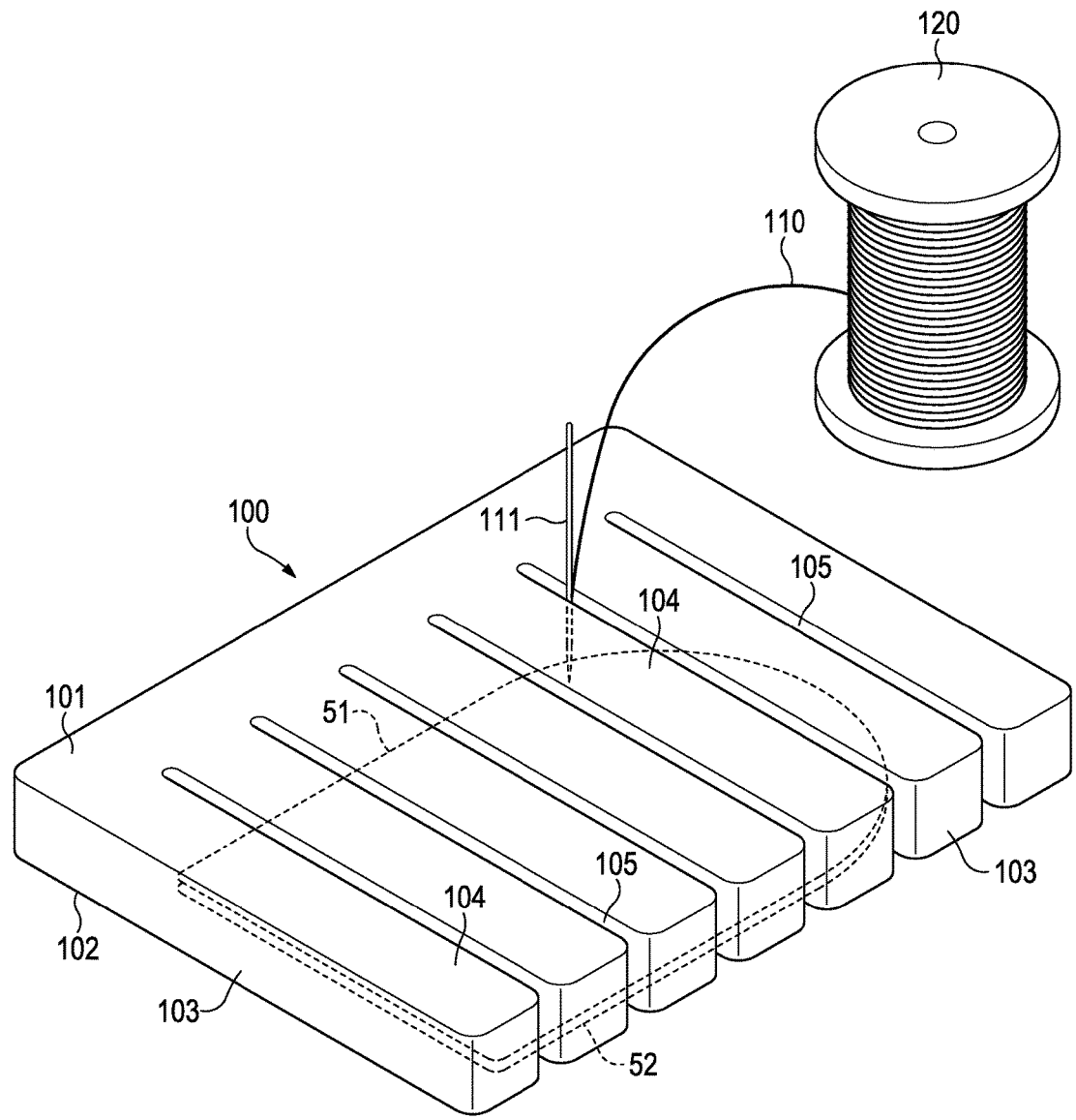
Figure 11C:
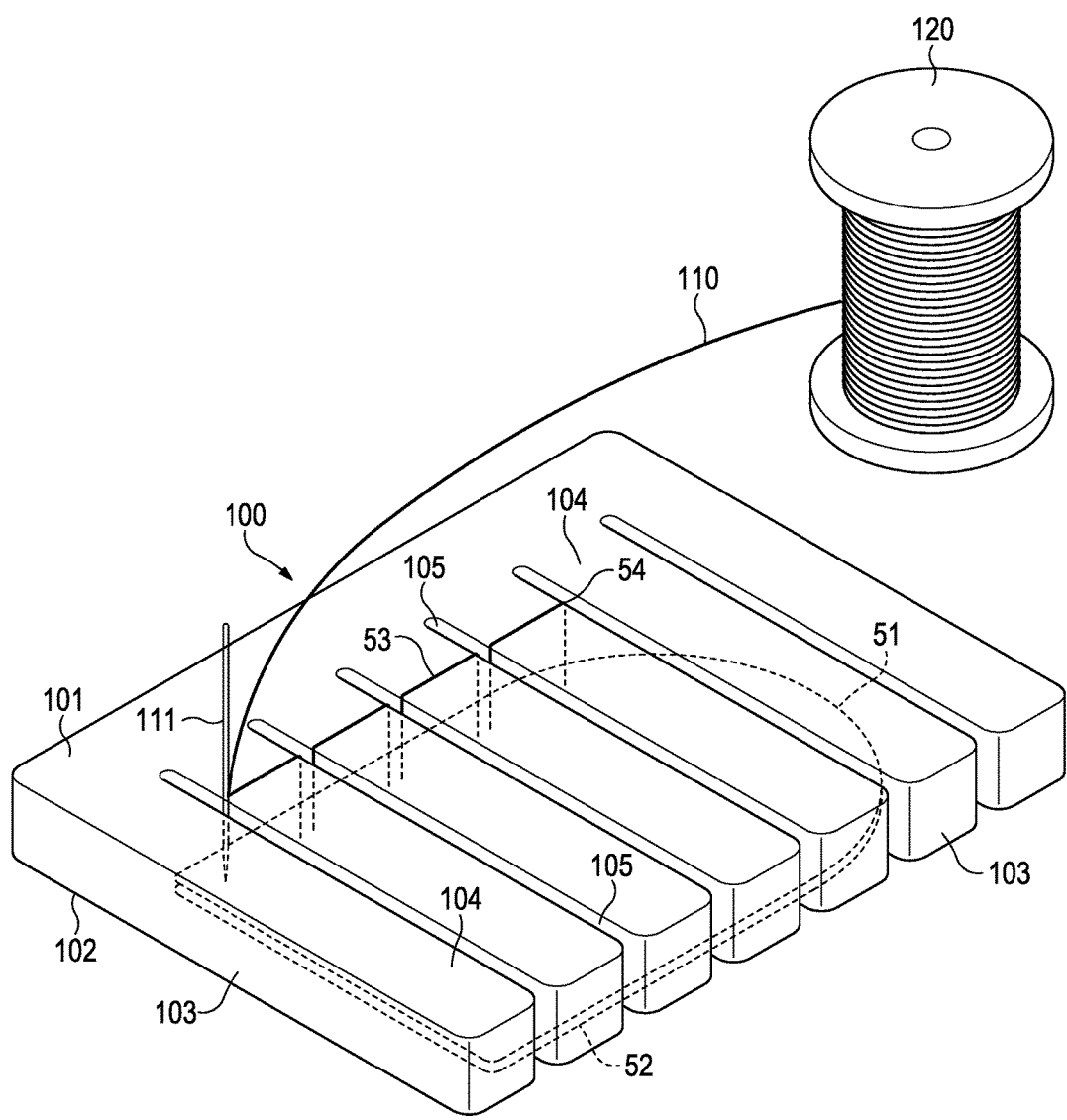

As another example, FIGS. 11A-11F schematically depict steps in another process for manufacturing tensile element 50. As depicted in FIG. 11A, first material layer 51 and second material layer 52 are stacked, with first material layer 51 being in contact with second material layer 52. Material layers 51 and 52 are then stacked with spacing structure 100 such that first material layer 51 is located between second material layer 52 and spacing structure 100, i.e., such that both material layers 51 and 52 are on the same side of spacing structure 100. Needle 111 then stitches, sews, or otherwise draws strand 110 from spool 120, through a gap 105 between support portions 104, through first material layer 51, and through second material layer 52. Strand 110 is then stitched, sewn, or otherwise drawn back through second material layer 52, first material layer 51, and the gap 105, creating a stitch joining first material layer 51 and second material layer 52, as depicted in FIG. 11B. Needle 111 is then moved over a support portion 104, positioned at an adjacent gap 105, and drawn in another loop, course, or stitch back through material layers 51 and 52 and over another support portion 104, and so on, until a row 54 of strand segments 53 or stitches extends across a plurality of support portions 104, as depicted in FIG. 11C. Strand 110 has been stitched in a direction substantially perpendicular to the direction in which support portions 104 and gaps 105 extend. That is, rows 54 primarily extend through a plurality of gaps 105 and a plurality of support portions 104.

Figure 11D:
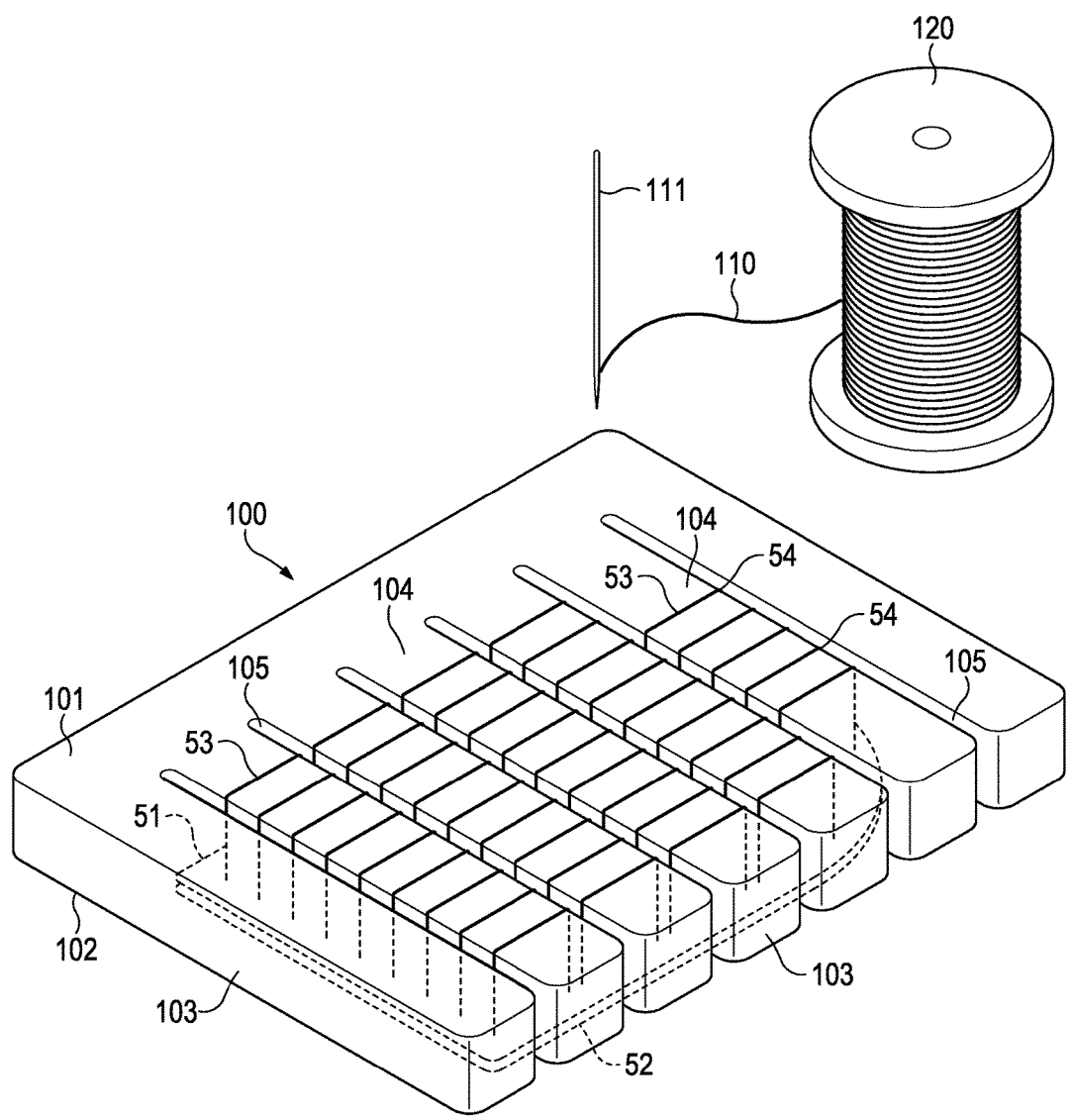
Figure 11E:
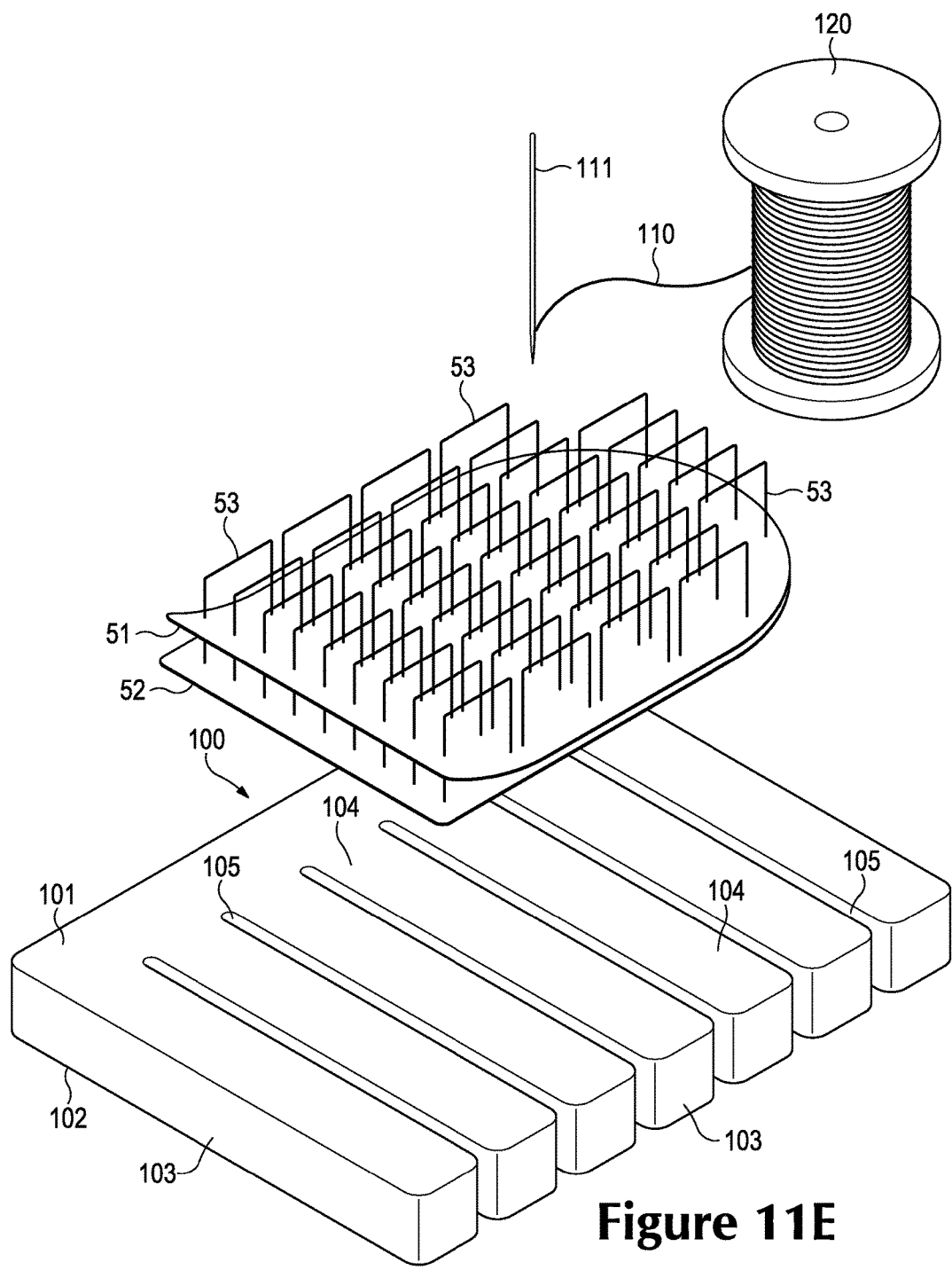
Figure 11F:
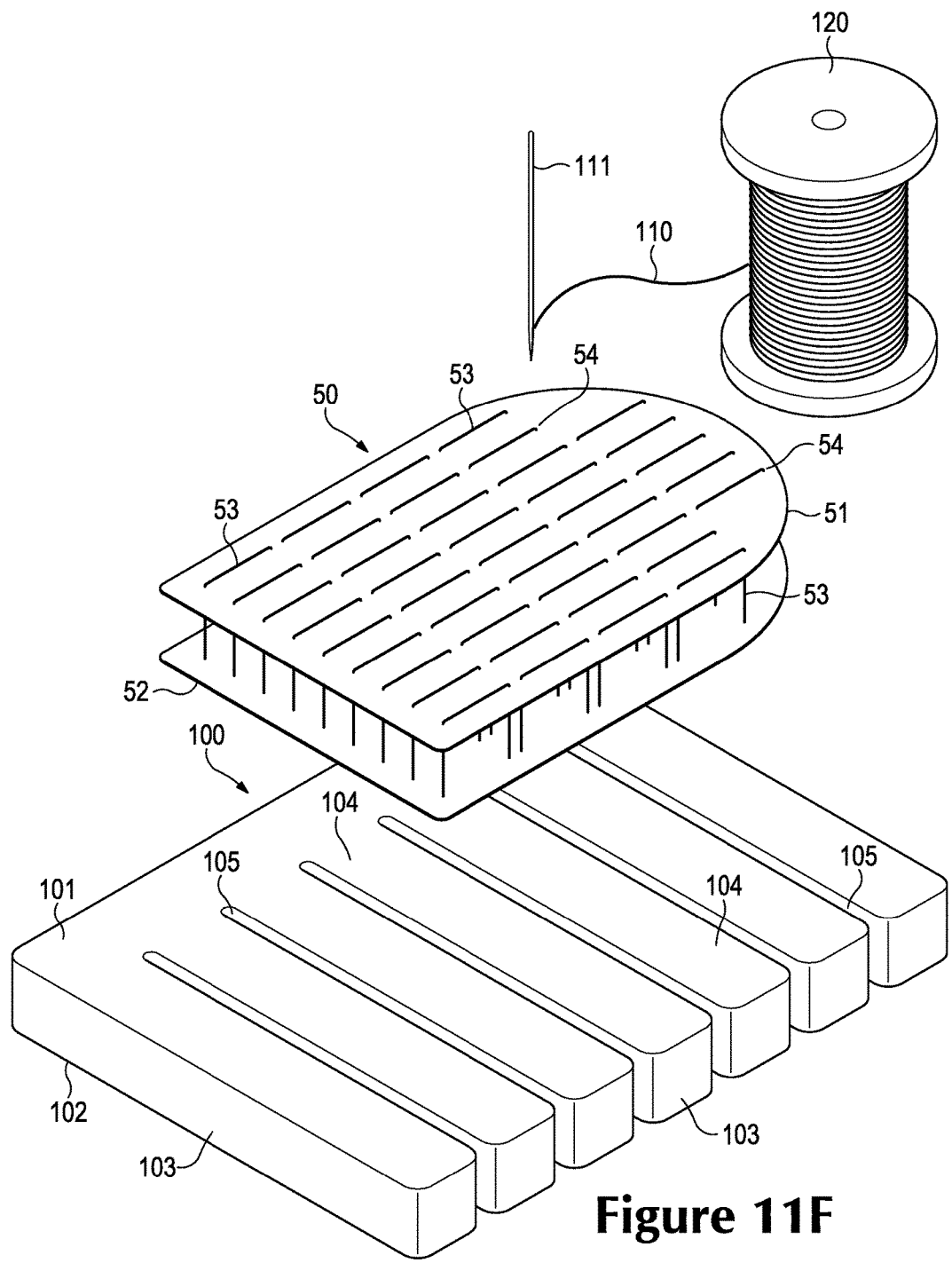

As depicted in FIG. 11D, the stitching of strand 110 has been completed, forming multiple rows 54 of strand segments 53 extending both across support portions 104 and through gaps 105 between support portions 104. Each of rows 54 may be formed from a separate or distinct portion of strand 110, or some or all of rows 54 may be formed from a single, contiguous portion of strand 110. Thereafter, as depicted in FIG. 11E, spacing structure 100 is removed. At this stage, portions of strand 110 form loops. First material layer 51 is then spaced from second material layer 52, as depicted in FIG. 11F, to provide tensile element 50 with a plurality of strand segments 53 positioned to extend between material layers 51 and 52.

Strand 110 (and, in turn, portions of strand 110 such as strand segments 53) may be formed to include any of a variety of materials and may have any of a variety of generally one-dimensional structures. As utilized herein, the term "one-dimensional structure" or variants thereof is intended to encompass generally elongate structures exhibiting a length that is substantially greater than a width and a thickness. The thickness of strand 110 may vary significantly to range from less than 0.03 millimeters to more than 5 millimeters, for example. Although one-dimensional structures will often have a cross-section where width and thickness are substantially equal (e.g., a round or square cross-section), some one-dimensional structures may have a width that is greater than a thickness (e.g., a rectangular, oval, or otherwise elongate cross-section). Despite the greater width, a structure may be considered one-dimensional if a length of the structure is substantially greater than a width and a thickness of the structure.

Suitable materials for strand 110 include rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Suitable generally one-dimensional structures for strand 110 include filaments, fibers, yarns, threads, cables, or rope. Whereas filaments have an indefinite length and may be utilized individually as strands, fibers have a relatively short length and generally go through spinning or twisting processes to produce a strand of suitable length. An individual filament utilized in strand 110 may be formed form a single material (i.e., a monocomponent filament) or from multiple materials (i.e., a bicomponent filament). In addition, different filaments may be formed from different materials. As an example, yarns utilized as strand 110 may include filaments that are each formed from a common material, may include filaments that are each formed from two or more different materials, or may include filaments that are each formed from two or more different materials. Yarns utilized as strand 110 may also include individual fibers formed from a single material, individual fibers formed from multiple materials, or different fibers formed from different materials. Similar concepts also apply to threads, cables, or ropes.

Material layers 51 and 52 may be formed of, or may be formed to include, a variety of materials. Material layers 51 and 52 may be formed to include various types of textiles, such as knitted textiles, woven textiles, non-woven textiles, spacer textiles, or mesh textiles, and may include various types of materials, such as rayon, nylon, polyester, polyacrylic, elastane, cotton, wool, or silk. The textiles may be substantially non-stretch, or may exhibit significant one-dimensional stretch, or may exhibit significant multi-directional stretch. Material layers 51 and 52 may also be formed to include supplemental polymer layers, polymer sheets, or synthetic leather, for example. Additionally, either of material layers 51 and 52 could be formed of combinations of materials, such as composite layers including both a textile material or layer and a polymer material or sheet.

Fluid-Filled Chamber Manufacturing Process

Figure 12:
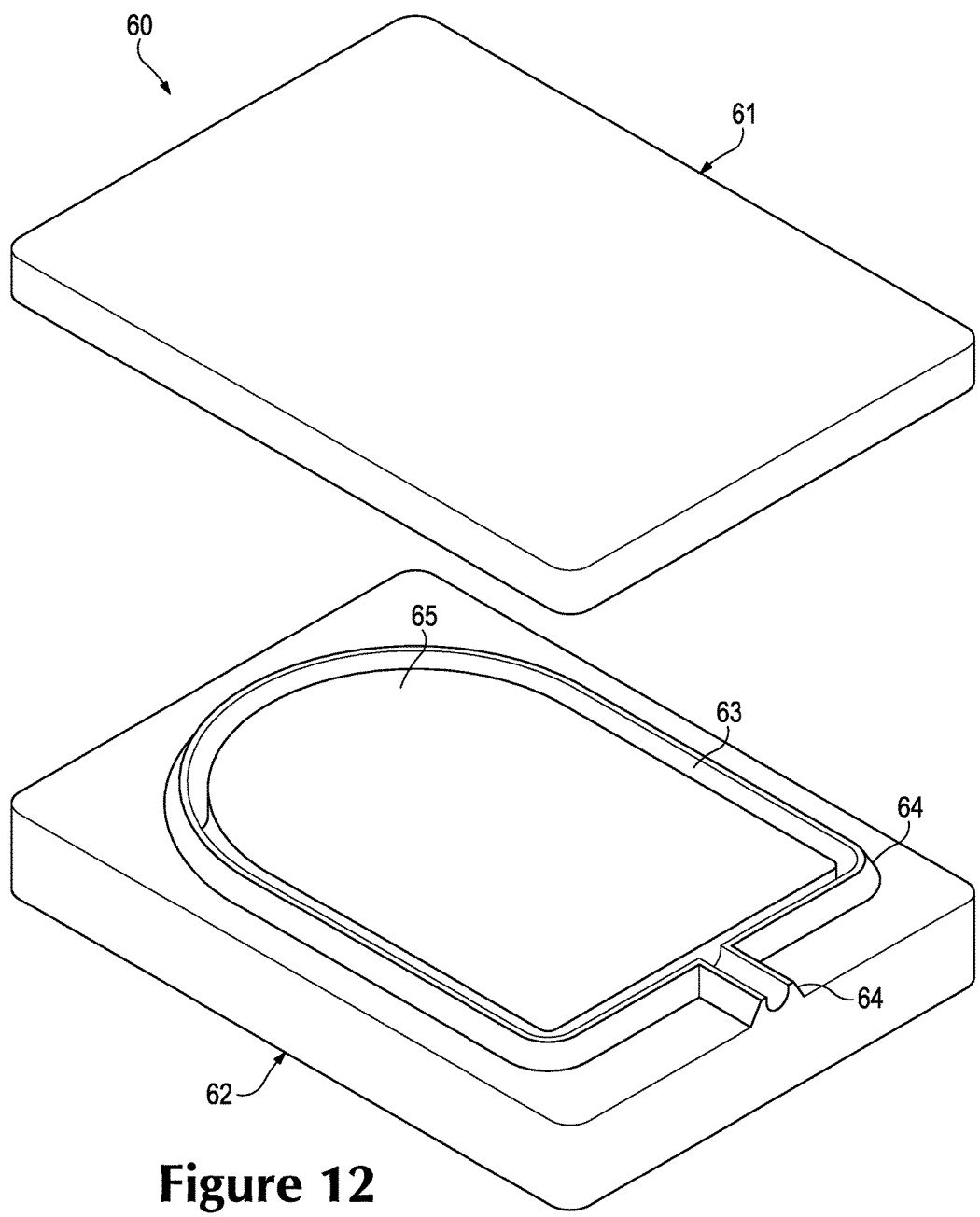
FIG. 12 is a perspective view of a mold that may be utilized in a process for manufacturing a chamber including the tensile element.

Although a variety of manufacturing processes may be utilized to form chamber 33, an example of a suitable thermoforming process will now be discussed. With reference to FIG. 12, a mold 60 that may be utilized in the thermoforming process is depicted as including a first mold portion 61 and a second mold portion 62. Mold 60 is utilized to form chamber 33 from a pair of polymer sheets that are molded and bonded to define barrier portions 41 and 42 as well as peripheral edge 43, and the thermoforming process secures tensile element 50 within barrier 40. More particularly, mold 60 (a) imparts shape to one of the polymer sheets in order to form first barrier portion 41, (b) imparts shape to the other of the polymer sheets in order to form second barrier portion 42, (c) imparts shape to one or both of the polymer sheets in order to form peripheral edge 43, (d) joins and seals the polymer sheets at peripheral bond 44, and (e) bonds tensile element 50 to each of barrier portions 41 and 42.

In preparation for the manufacturing process, various components forming chamber 33 may be obtained and organized. For example, tensile element 50 may be formed and, if necessary, cut to a shape generally corresponding with the shapes of various features of mold portions 61 and 62. A first polymer sheet 71 and a second polymer sheet 72 may be used to form barrier 40. Tensile element 50 may be positioned between first polymer sheet 71 and second polymer sheet 72. Upon completion of the manufacturing process, when chamber 33 is pressurized, tensile element 50 is placed in tension and barrier portions 41 and 42, formed from polymer layers 71 and 72, are spaced from each other.

Figure 13A:
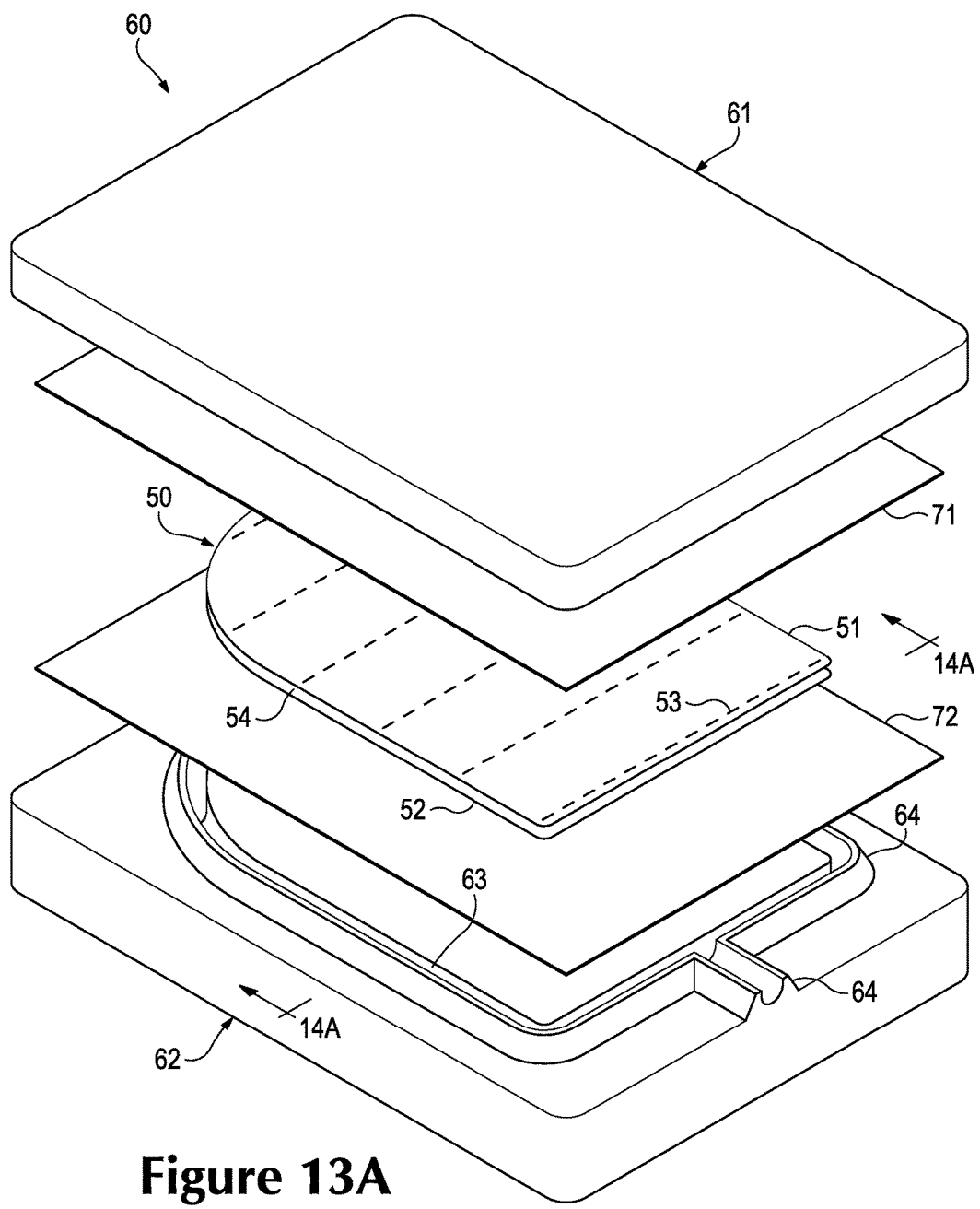
FIGS. 13A-13D are perspective views depicting the process for manufacturing the chamber.
Figure 14A:
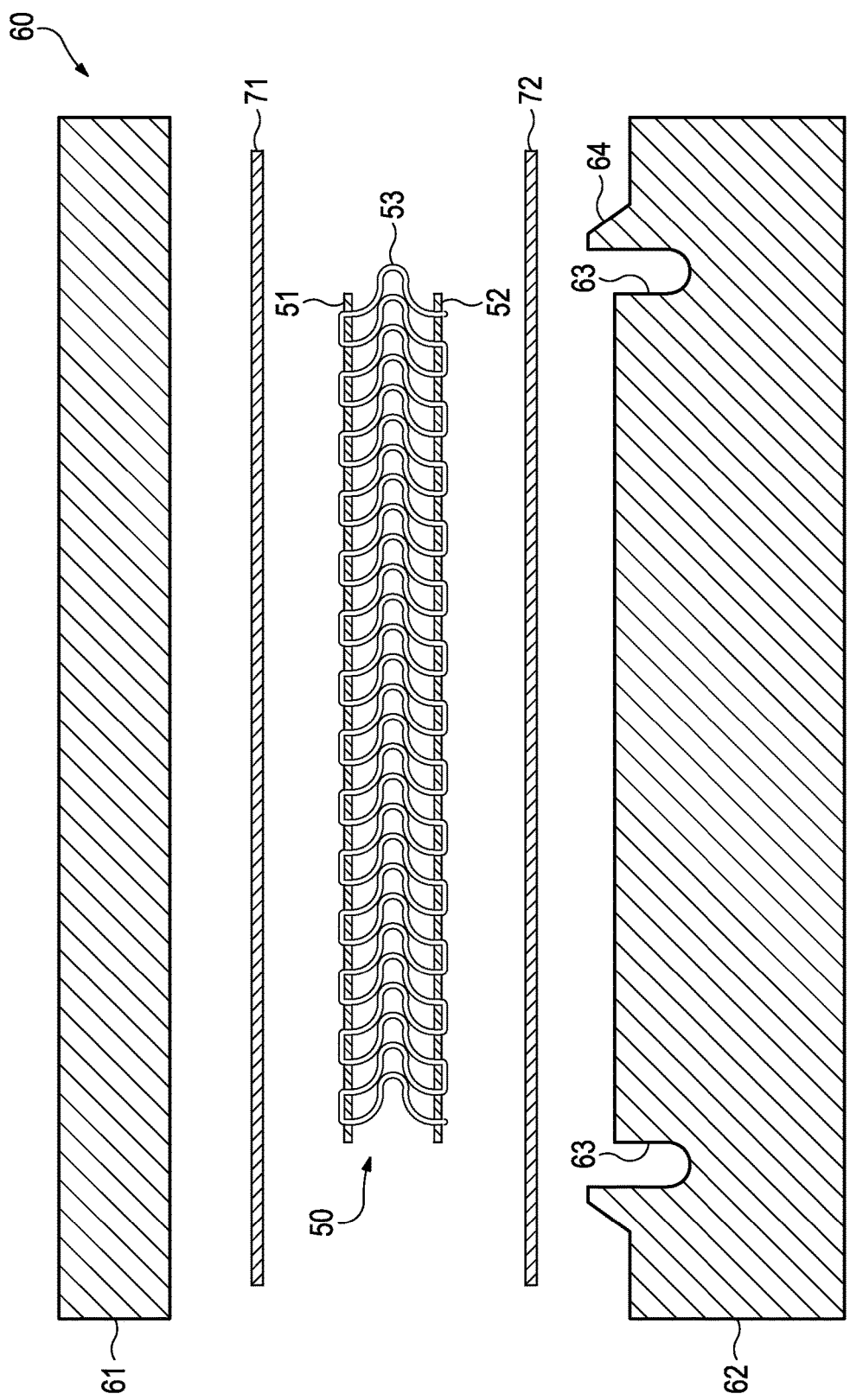
FIGS. 14A-14D are schematic cross-sectional views of the process for manufacturing the chamber, as respectively defined by section lines 14A-14D in FIGS. 13A-13D.

In manufacturing chamber 33, the various components of chamber 33 are located between mold portions 61 and 62, as depicted in FIGS. 13A and 14A. In order to properly position the components, a shuttle frame or other device may be utilized. Subsequently, the various components of chamber 33 are heated to a temperature that facilitates bonding between the components. Depending upon the specific materials utilized for tensile element 50 and polymer sheets 71 and 72, which form barrier 40, suitable temperatures may range from 120 to 200 degrees Celsius (248 to 392 degrees Fahrenheit) or more. Various radiant heaters or other devices may be utilized to heat the various components of chamber 33. In some manufacturing processes, mold 60 may be heated such that contact between mold 60 and the various components of chamber 33 raises the temperature of the components to a level that facilitates bonding. In alternate manufacturing processes, the various components of chamber 33, such as one or more of polymer sheets 71 and 72 and tensile element 50, may be heated before being located between mold portions 61 and 62.

Once the various components of chamber 33 are positioned and heated, mold portions 61 and 62 translate toward each other and begin to close upon the components such that (a) first mold portion 61 contacts first polymer sheet 71, and (b) ridge 64 of second mold portion 62 contacts second polymer sheet 72. In turn, first polymer sheet 71 may be brought closer to first material layer 51 of tensile element 50, and polymer layer 72 may be brought closer to second material layer 52 of tensile element 50. The components are thus located relative to mold 60 and initial shaping and positioning has occurred.

Air may then be partially evacuated from the area around polymer sheets 71 and 72 through various vacuum ports in mold portions 61 and 62. The purpose of evacuating the air is to draw polymer sheets 71 and 72 into contact with the various contours of mold 60. This ensures that polymer sheets 71 and 72 are properly shaped in accordance with the contours of mold 60. Note that polymer sheets 71 and 72 may stretch in order to extend around tensile element 50 and into mold 60. The thickness of polymer sheets 71 and 72 before being compressed between mold portions 61 and 62 may be greater than the thickness of the corresponding portions of barrier 40 after the manufacture of chamber 33 has been completed. This difference between the original thicknesses of polymer sheets 71 and 72 and the resulting thickness of barrier 40 may occur as a result of the stretching taking place at this stage of the thermoforming process.

Mold portions 61 and 62 may compress and place a specific degree of pressure upon the components, thereby bonding and securing polymer sheets 71 and 72 to opposite surfaces of tensile element 50. More specifically, first polymer sheet 71 may be thermobonded to first material layer 51 of tensile element 50. Similarly, second polymer sheet 72 may be thermobonded to second material layer 52 of tensile element 50. Second mold portion 62 includes a peripheral cavity 63 that forms peripheral edge 43 from second polymer layer 72. As depicted in FIGS. 12-14D, polymer sheets 71 and 72 are thermobonded to tensile element 50, but in other manufacturing processes, polymer sheets 71 and 72 may at least partially be otherwise secured to tensile element 50. For example, polymer sheets 71 and 72 may at least partially be secured to tensile element 50 by an adhesive, or by use of thermoplastic threads or strips, as disclosed in U.S. Pat. No. 7,070,845 to Thomas, et al.

As utilized herein, the term "thermobonding" or variants thereof is defined as a securing technique between two elements that involves a softening or melting of a thermoplastic polymer material within at least one of the elements such that the materials of the elements are secured to each other when cooled. Similarly, the terms "thermobond" or variants thereof is defined as the bond, link, or structure that joins two elements through a process that involves a softening or melting of a thermoplastic polymer material within at least one of the elements such that the materials of the elements are secured to each other when cooled. Thermobonding may involve, for example, the melting or softening of thermoplastic materials within each of two or more elements to join the elements. Accordingly, thermobonding may create a polymer bond (i.e., a thermobond between a polymer material of one element and a polymer material of another element).

Thermobonding does not generally involve the use of stitching or adhesives, but involves directly bonding elements to each other with heat. In some situations, however, stitching or adhesives may be utilized to supplement the thermobond or the joining of elements through thermobonding. For example, as an alternative to thermobonding, or in addition to thermobonding, an adhesive, a thermally-activated adhesive, or other securing structure may be utilized in joining the elements.

Figure 13B:
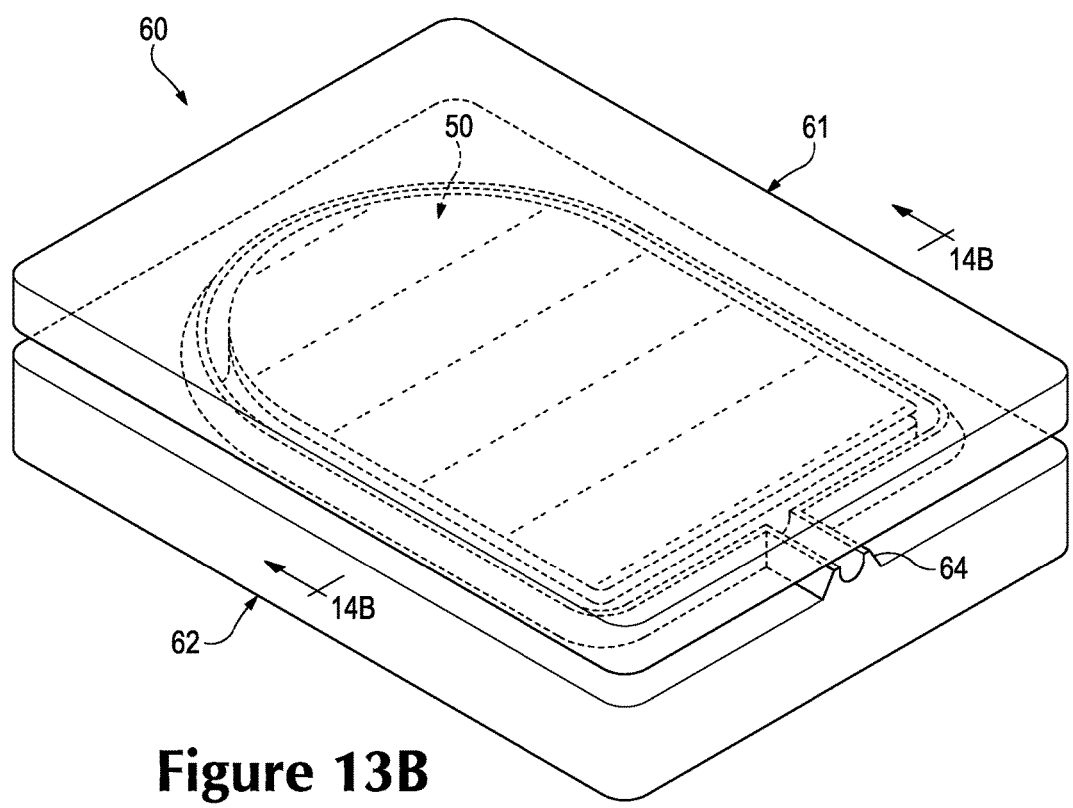
Figure 14B:
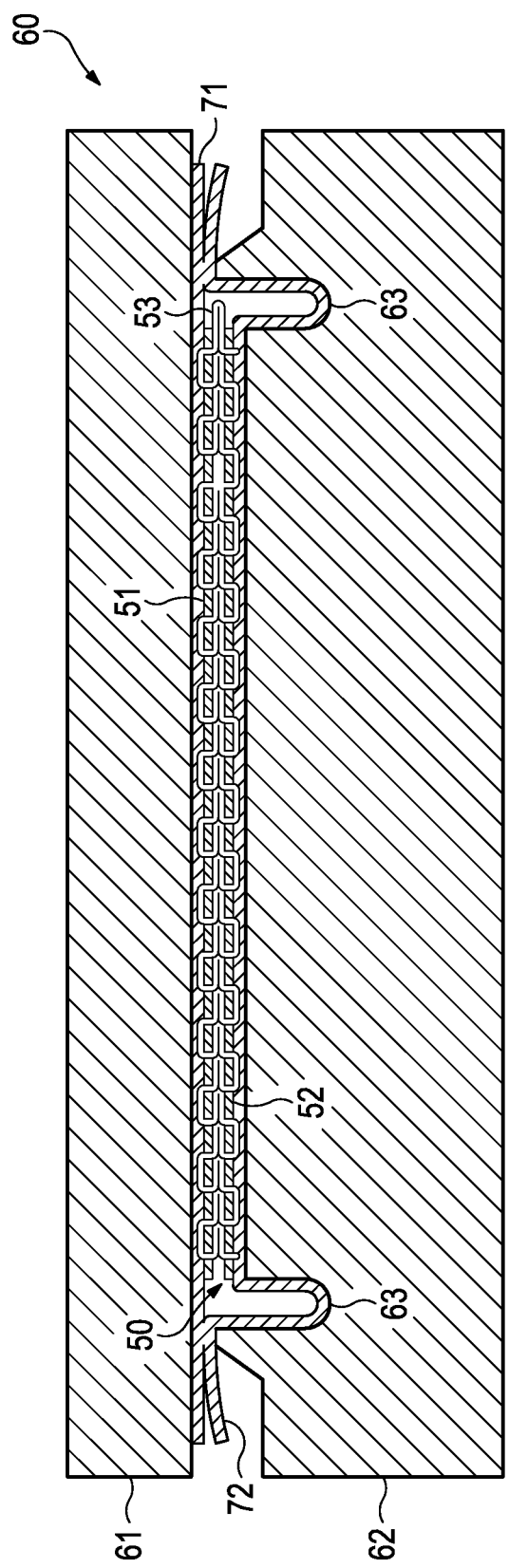

As mold 60 closes further, first mold portion 61 and ridge 64 bond first polymer sheet 71 to second polymer sheet 72, as depicted in FIGS. 13B and 14B, thereby forming peripheral bond 44 and an interior void between polymer sheets 71 and 72. Furthermore, portions of ridge 64 that extend away from tensile element 50 form a bond between other areas of polymer sheets 71 and 72, contributing to the formation of an inflation conduit 73.

In order to provide another means for drawing polymer sheets 71 and 72 into contact with the various contours of mold 60, the area between polymer sheets 71 and 72 and proximal to tensile element 50 may be pressurized. During a preparatory stage of this method, an injection needle may be located between polymer sheets 71 and 72, and the injection needle may be located such that ridge 64 envelops the injection needle when mold 60 closes. A gas may then be ejected from the injection needle such that polymer sheets 71 and 72 engage ridge 64. Inflation conduit 73 may thereby be formed between polymer sheets 71 and 72 (see FIG. 13C). The gas may then pass through inflation conduit 73, thereby entering and pressurizing the area proximal to tensile element 50 and between polymer sheets 71 and 72. In combination with the vacuum, the internal pressure ensures that polymer sheets 71 and 72 contact the various surfaces of mold 60.

As discussed above, a supplemental layer of a polymer material or thermoplastic threads may be added to or incorporated within tensile element 50 in order to facilitate bonding between tensile element 50 and barrier 40. The pressure exerted upon the components by mold portions 61 and 62 may ensure that the supplemental layer or thermoplastic threads form a bond with polymer sheets 71 and 72.

Figure 13C:
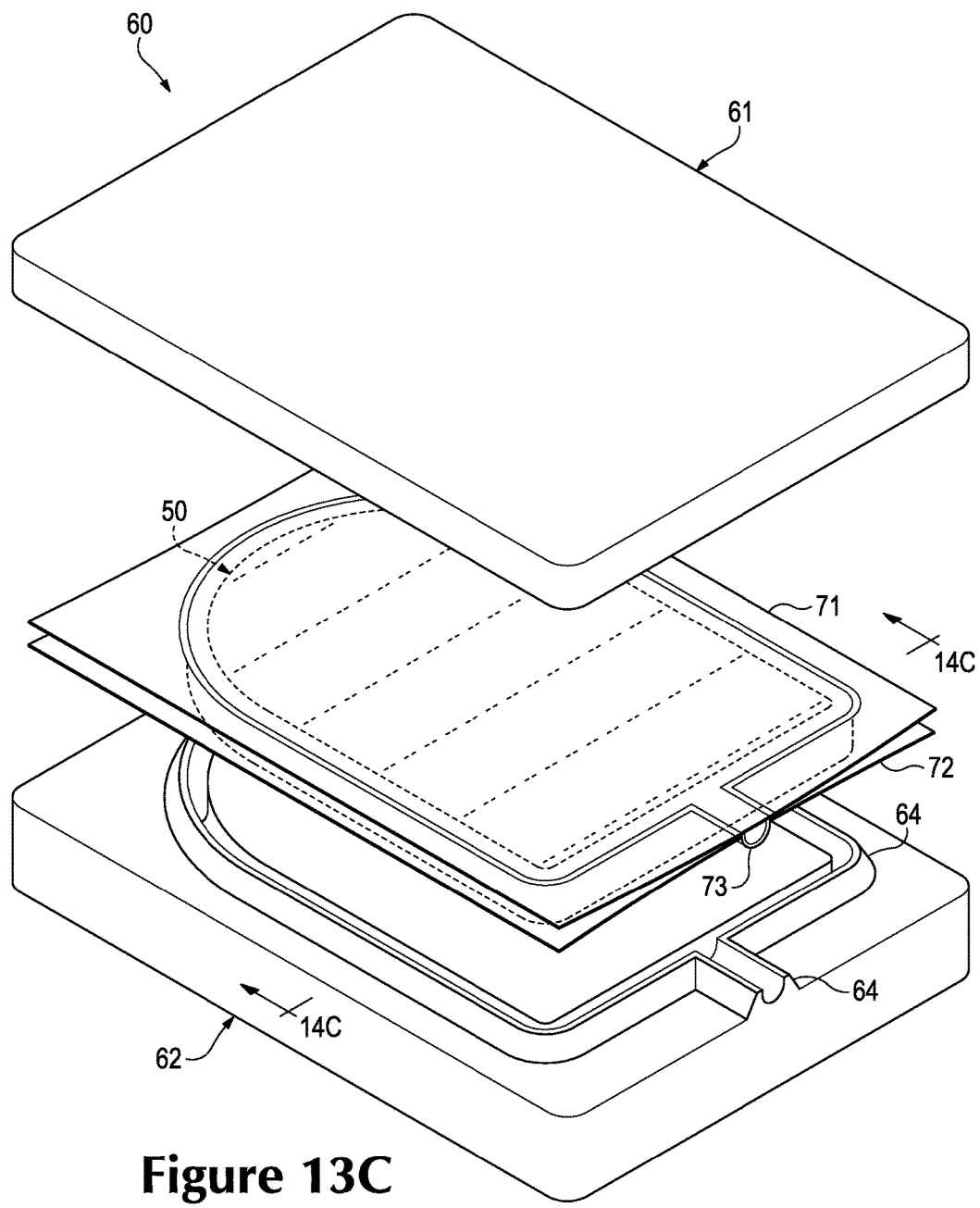
Figure 14C:
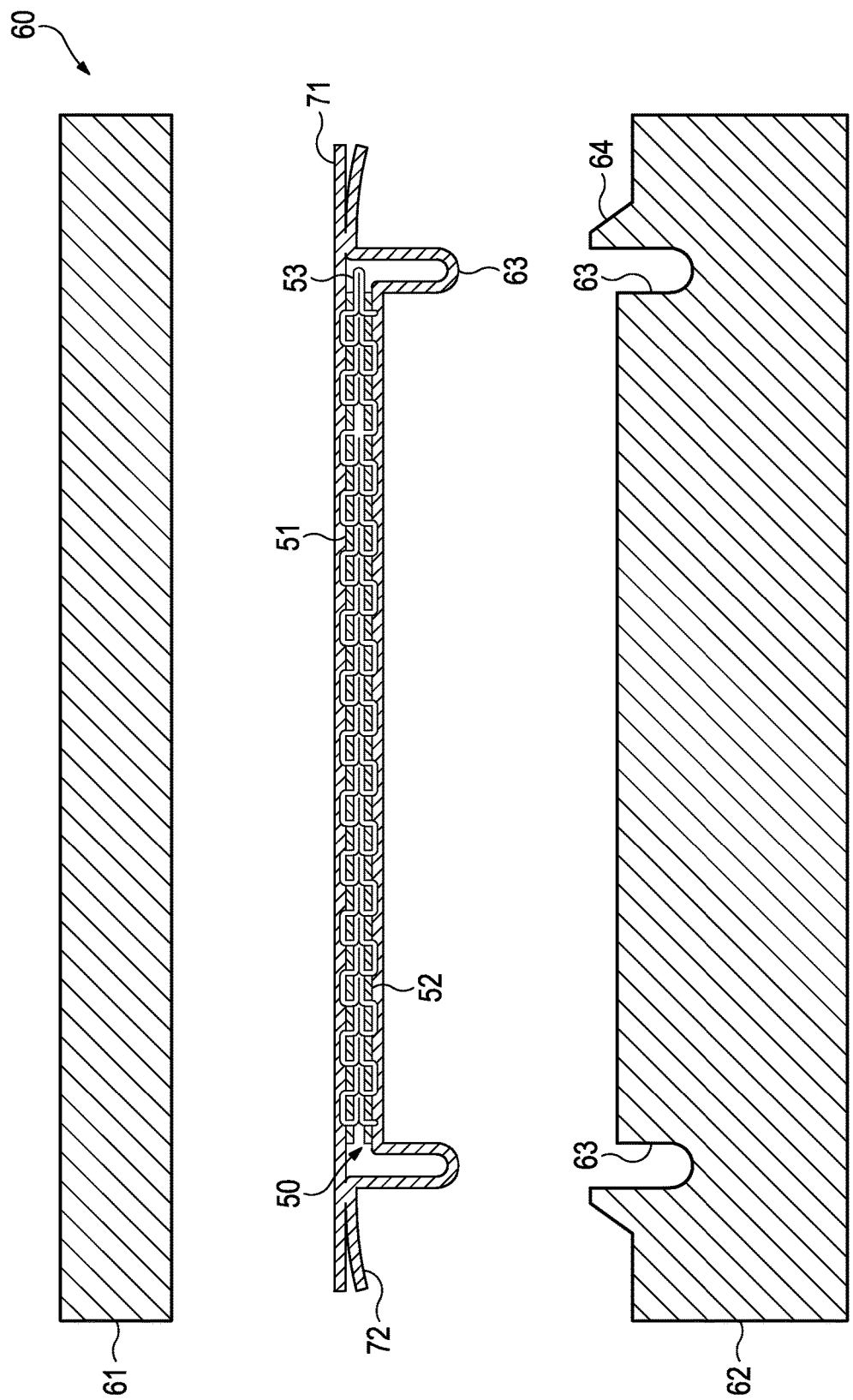

When bonding is complete, mold 60 is opened and the various components of chamber 33 and excess portions of polymer sheets 71 and 72 are permitted to cool, as depicted in FIGS. 13C and 14C. A fluid may be injected into the interior void through an inflation needle and inflation conduit 73. Upon exiting mold 60, tensile element 50 remains in a compressed configuration. When the various components of chamber 33 are pressurized, however, the fluid places an outward force upon barrier 40, which tends to separate barrier portions 41 and 42, thereby placing tensile element 50 in tension. More specifically, strand segments 53 extending between first material layer 51 and second material layer 52 are placed in tension, as is the portion of strand 110 comprising all the strand segments 53 of a particular row 54.

Figure 13D:
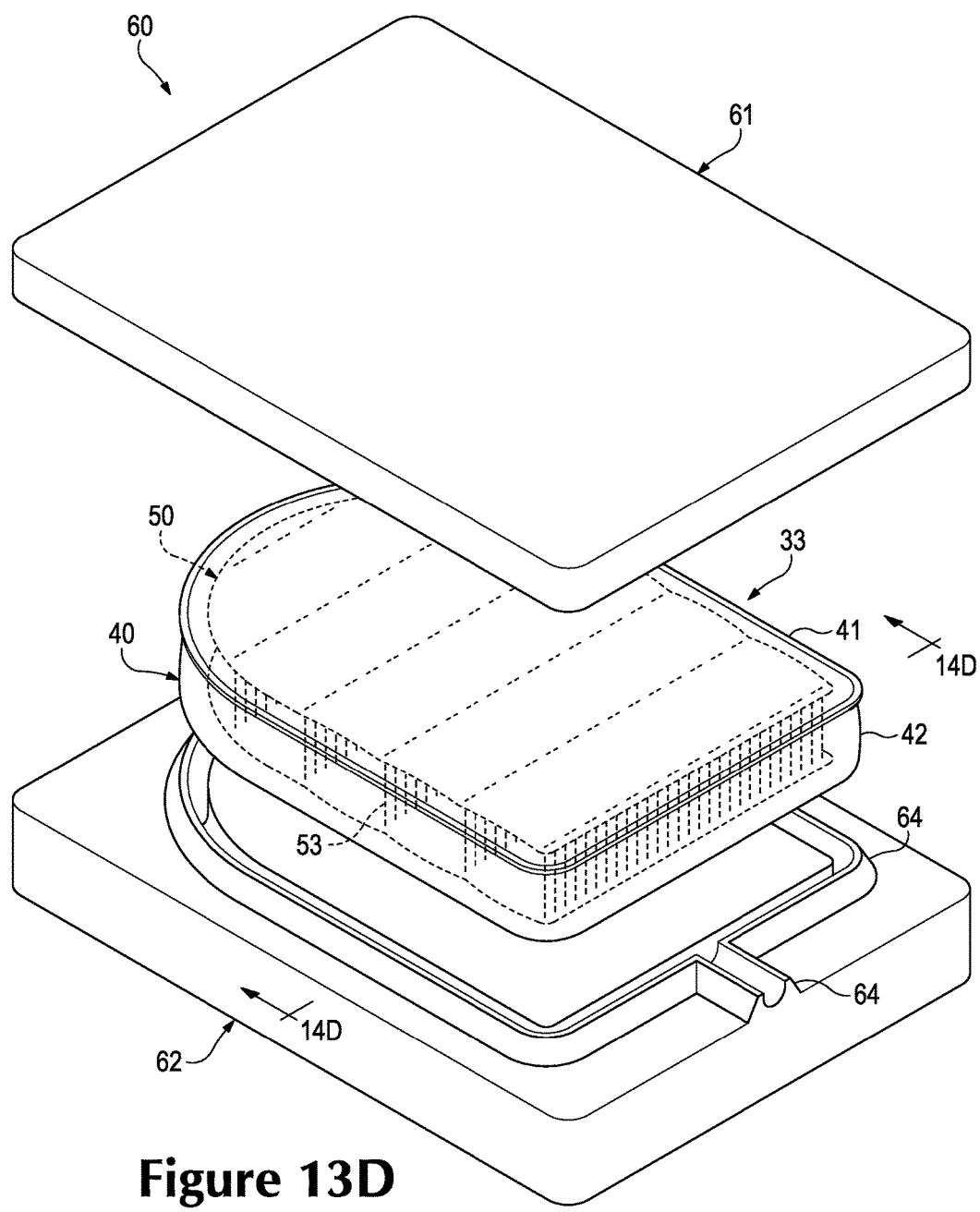
Figure 14D:
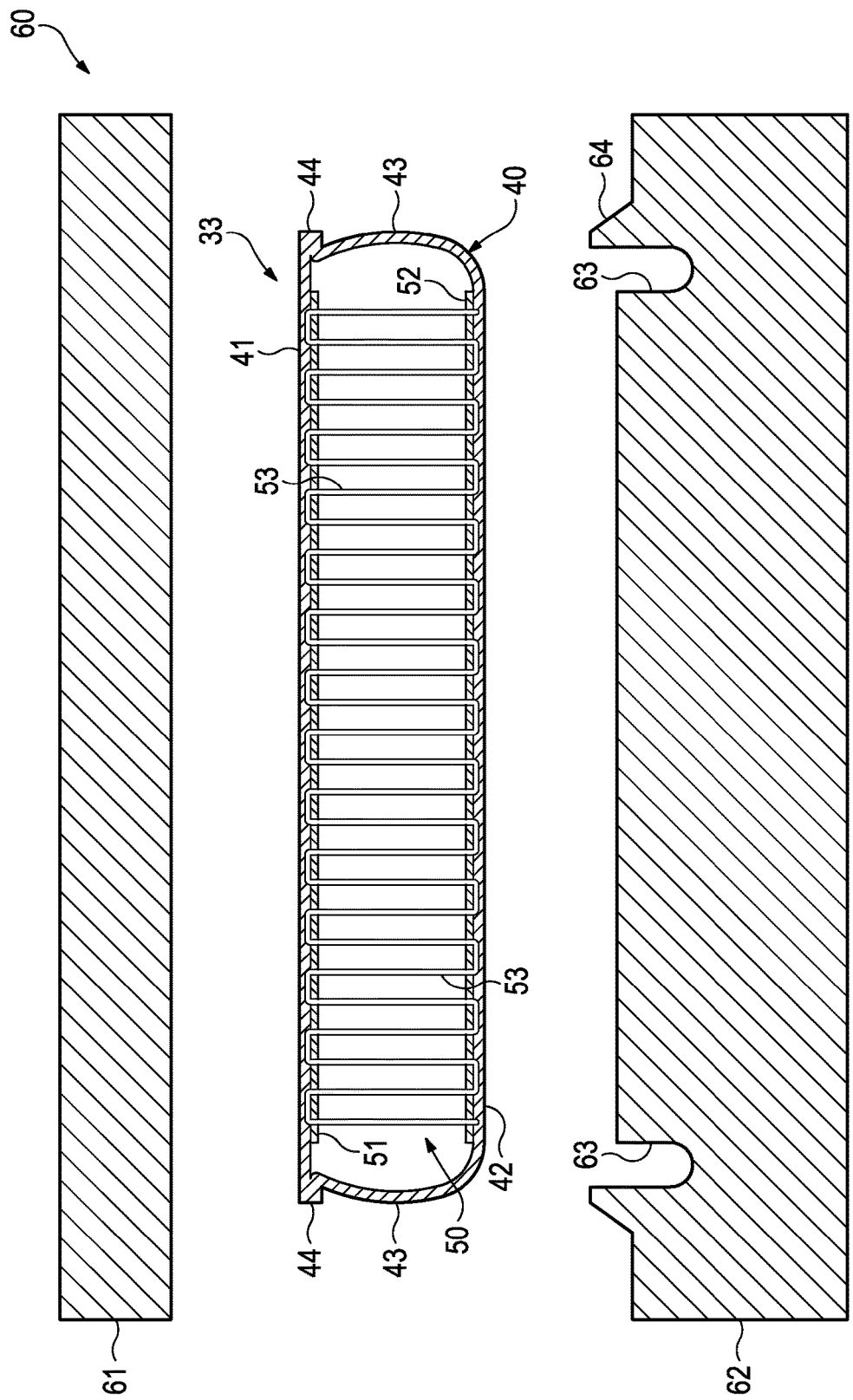

In addition, a sealing process is utilized to seal inflation conduit 73 after pressurization. The excess portions of polymer sheets 71 and 72 are then removed, thereby completing the manufacture of chamber 33, as depicted in FIGS. 13D and 14D. As an alternative, the order of inflation and removal of excess material may be reversed. Finally, chamber 33 may be tested and then incorporated into midsole 31 of footwear 10.

Further Configurations

Figure 15A:
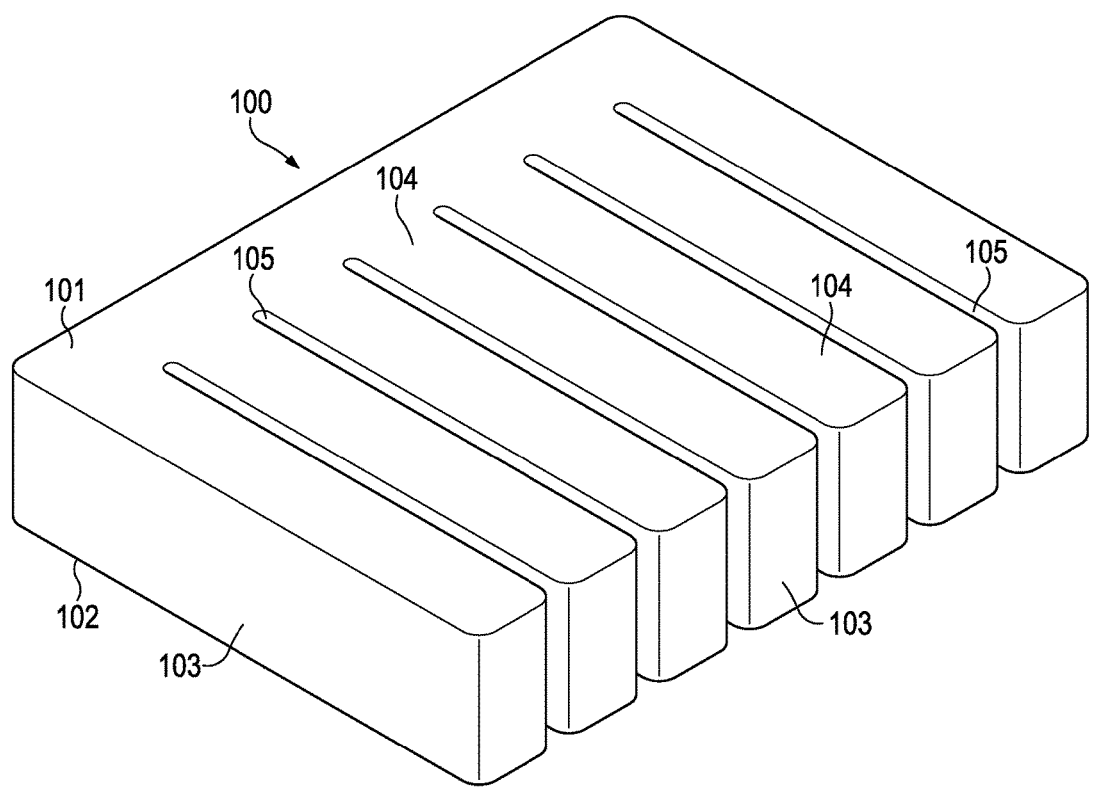
FIGS. 15A-15H are perspective views corresponding with FIG. 9 and depicting additional configurations of the spacing structure.
Figure 15B:
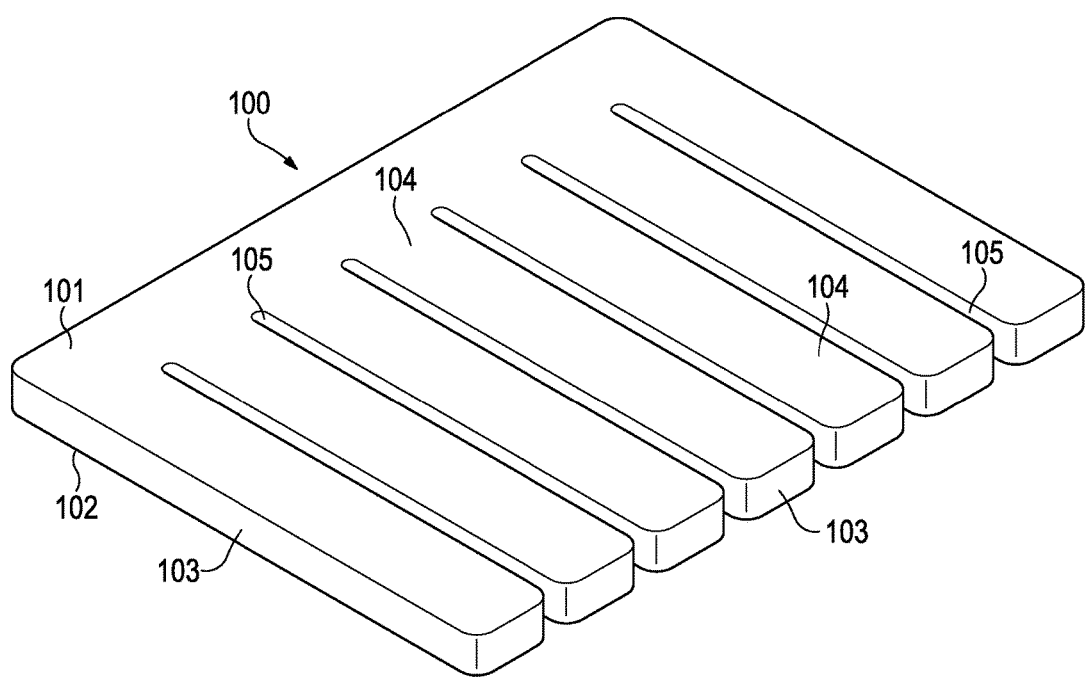

Although chamber 33 is described above and depicted in FIGS. 4-8C, and although various exemplary processes for manufacturing tensile element 50 are described above and depicted in FIG. 9-11F, these configurations of chamber 33 and processes for manufacturing tensile element 50 are initial configurations. Other configurations are possible. For example, as depicted in FIGS. 15A-18C, spacing structure 100 and tensile element 50 may have a range of configurations. For example, as depicted in FIGS. 15A and 15B, spacing structure 100 may have any of a variety of heights, such as the relatively taller height depicted in FIG. 15A, or the relatively shorter height depicted in FIG. 15B. Similarly, although depicted as extending beyond first material layer 51 and second material layer 52 in FIGS. 9-11F, spacing structure 100 may have any of a range of widths or lengths, including a width shorter than or substantially equal to the width of material layer 51 or 52, or a length shorter than or substantially equal to the length of material layer 51 or 52.

Additionally, spacing structure 100 is depicted in FIGS. 9-11F as having a comb-like structure bounded by a substantially rectangular shape. In various other configurations, spacing structure 100 may be bounded by any of a range of shapes, including regular geometric shapes such as squares, circles, triangles, and hexagons, as well as any other shape, regular or irregular, including shapes corresponding with alternate portions of a foot. Similarly, although depicted as having a shape similar to heel region 13 of footwear 10, material layers 51 and 52 may have any of a range of shapes, including regular geometric shapes as well as any other shape, regular or irregular, including shapes corresponding with alternate portions of a foot.

Figure 15C:
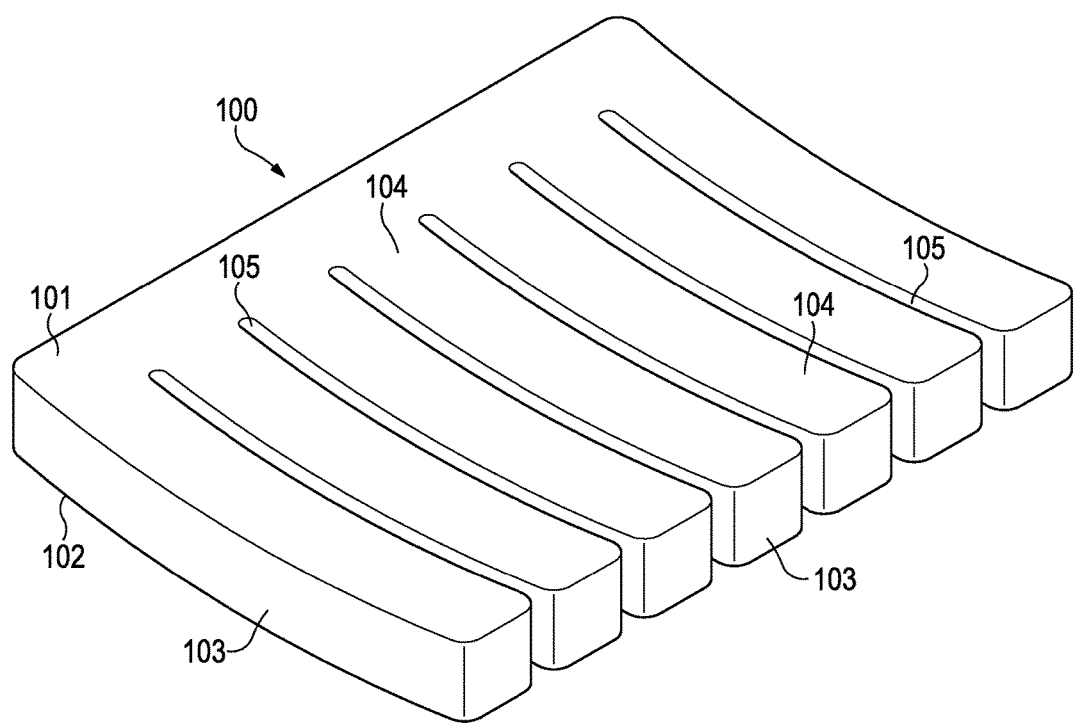
Figure 15D:
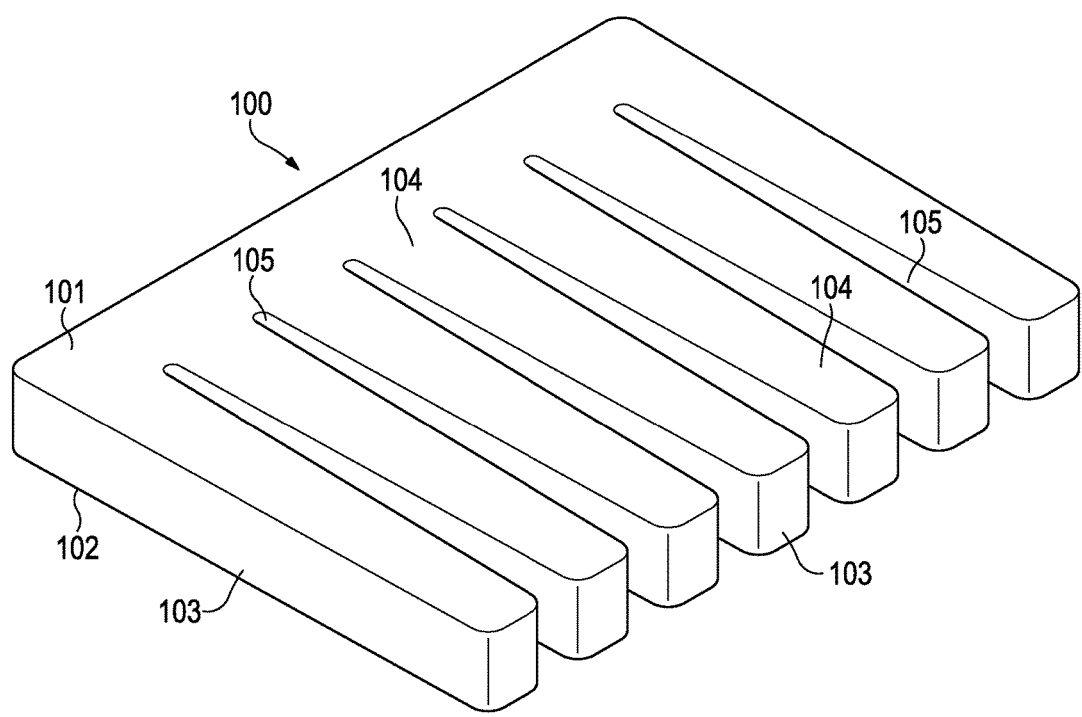
Figure 15E:
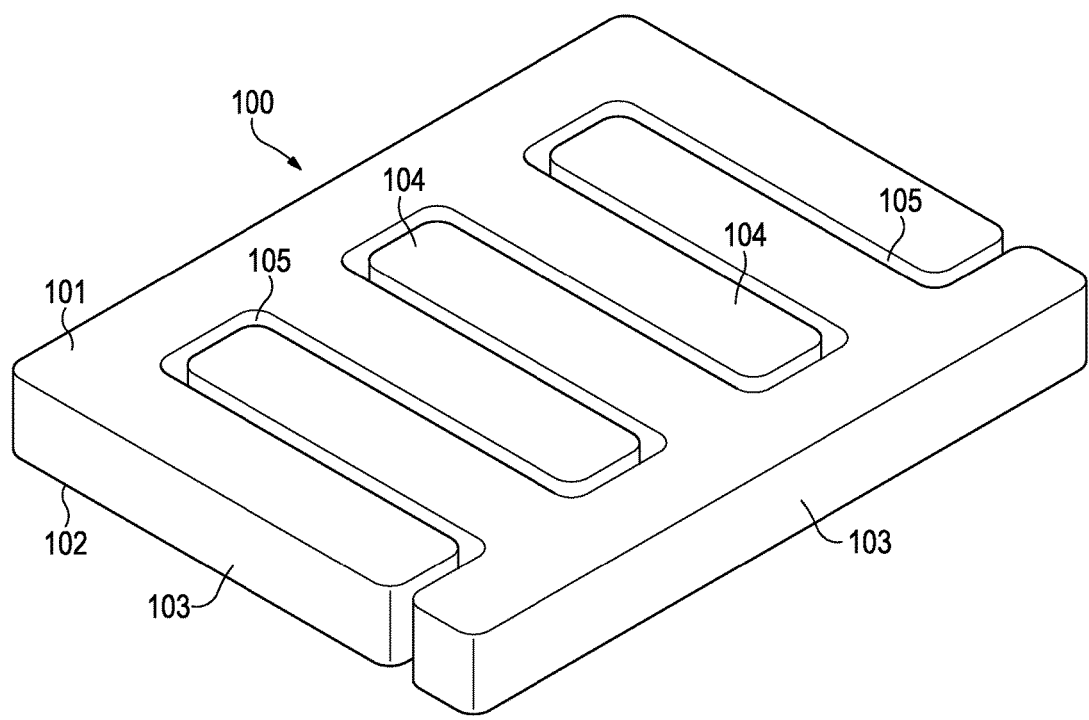
Figure 15F:
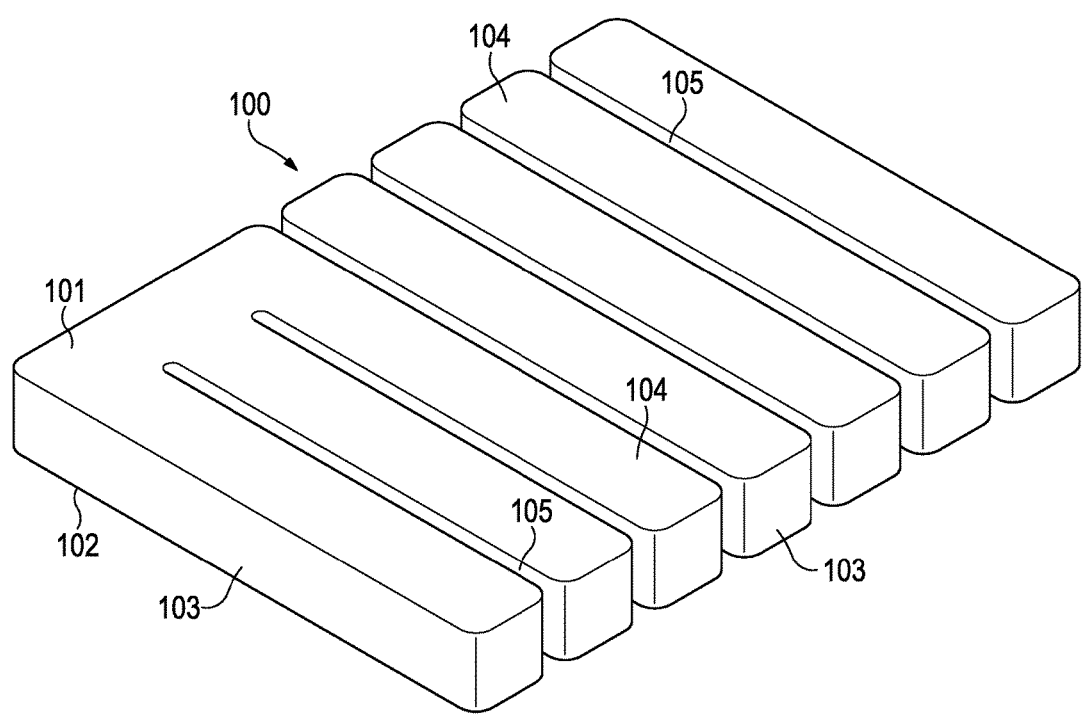

As depicted in FIGS. 9-11F, spacing structure 100 has support portions 104 and gaps 105 that are substantially linear and have substantially uniform width. However, support portions 104 and gaps 105 may be otherwise configured. For example, as depicted in FIG. 15C, support portions 104 and gaps 105 may be substantially curved. Furthermore, as depicted in FIG. 15D, support portions 104 and gaps 105 may have non-uniform width, such that their width near one side of spacing structure 100 is substantially greater than their width near an opposite side of spacing structure 100.

In the comb-like structure depicted in FIGS. 9-11F, all the support portions 104 of spacing structure 100 extend away from a side of spacing structure 100, such that spacing structure 100 has a unitary or one-piece configuration. Other configurations of spacing structure 100 are possible. For example, spacing structure 100 in FIG. 15E has a two-piece configuration including two portions resembling comb-like structures having interlocking fingers. In other words, some support portions 104 of spacing structure 100 may be part of one unitary or one-piece portion of spacing structure 100, whereas other support portions 104 of spacing structure 100 may be part of another unitary or one-piece portion of spacing structure 100. Accordingly, in various configurations, support portions 104 of spacing structure 100 may include any number of unitary or one-piece portions. In an alternate example depicted in FIG. 15F, spacing structure 100 includes support portions 104 that extend away from a side of a unitary or one-piece portion of spacing structure 100, and spacing structure 100 also includes a plurality of support portions 104 that are self-contained unitary or one-piece portions of spacing structure 100.

Figure 15G:
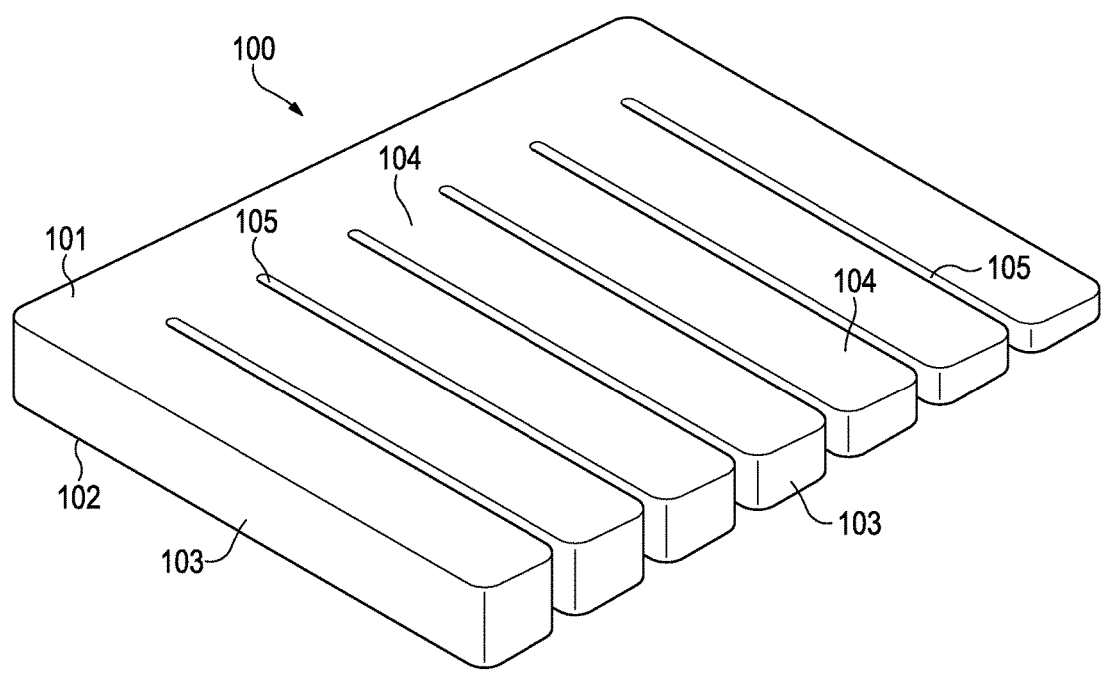
Figure 15H:
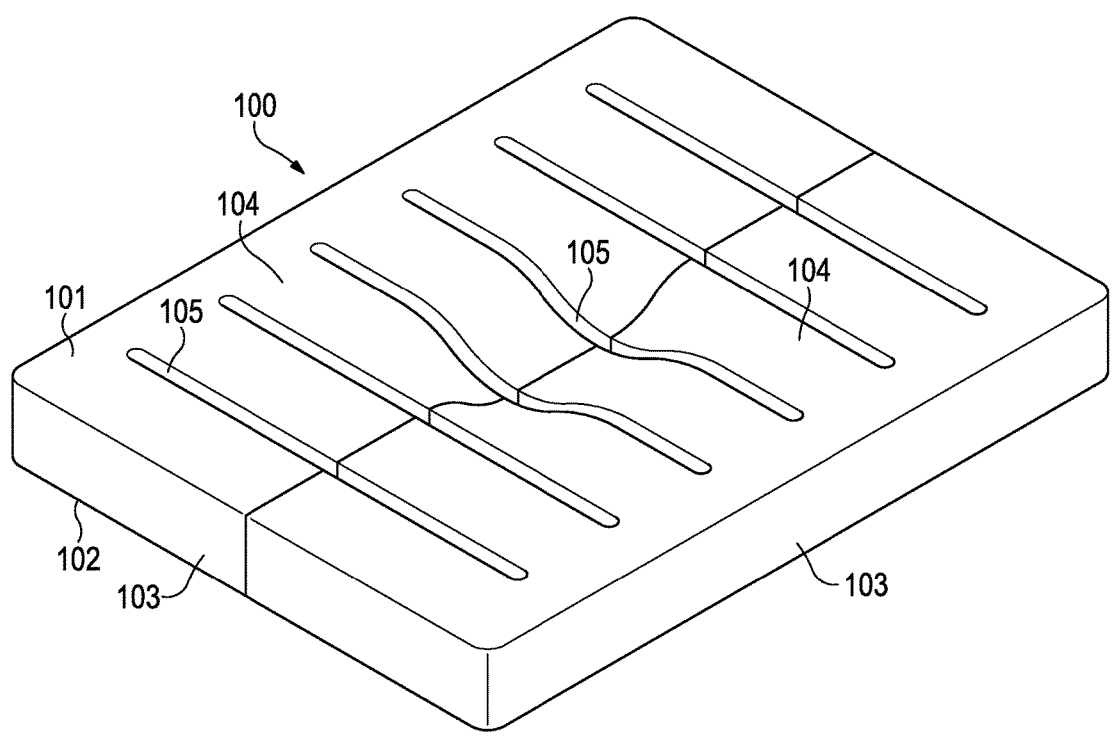

Furthermore, although depicted in FIGS. 9-11F as having a substantially uniform height, spacing structure 100 as well as support portions 104 and gaps 105 may have non-uniform heights that may impart a non-uniform contour to spacing structure 100, and may accordingly also impart a non-uniform structure to tensile element 50. For example, as depicted in FIG. 15G, spacing structure 100 has a greater height at a first end than at a second end, and substantially linearly decreases in height from the first end to the second end, which imparts a substantially linear decrease in height to support portions 104 and gaps 105. Accordingly, as depicted in FIG. 15G, spacing structure 100 may impart a tapered configuration to tensile element 50. As a further example, as depicted in FIG. 15H, spacing structure 100 includes two one-piece or unitary portions, each portion having a comb-like configuration, and the fingers of the two comb-like portions extending away from a side of each portion and toward each other. The two comb-like portions of spacing structure 100 cooperatively define a depression within first surface 101 of spacing structure 100. Accordingly, as depicted in FIG. 15H, spacing structure 100 may impart a heel cup to tensile element 50, as depicted in cross-section in FIG. 17A. Similarly, in various configurations, first surface 101, second surface 102, and side surfaces 103 of spacing structure 100 may have any of a variety of non-planar contours, which may in turn impart corresponding non-planar contours to tensile element 50.

Figure 16A:
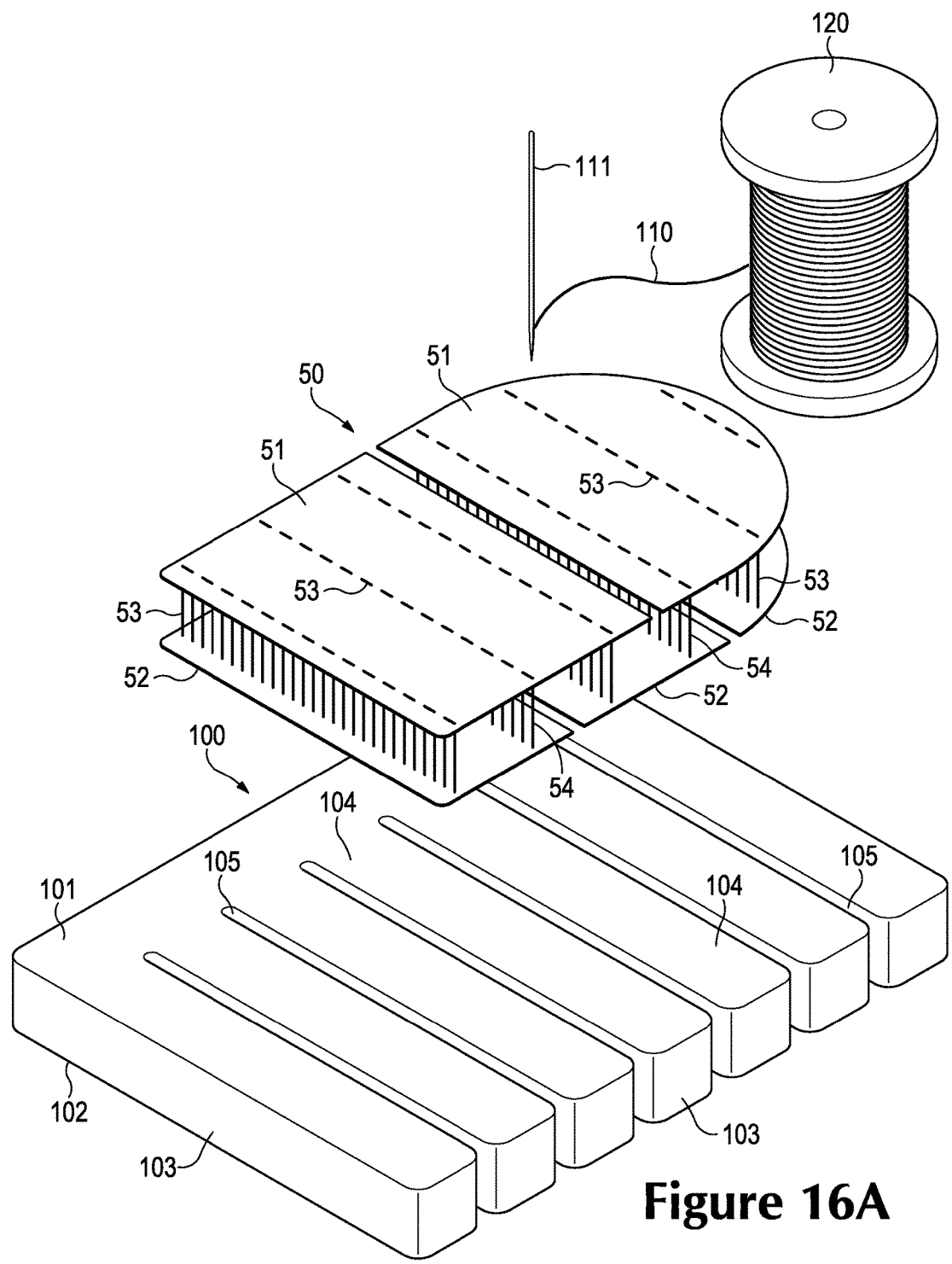
FIGS. 16A-16C are perspective views corresponding with FIG. 10D and depicting additional configurations of the process for manufacturing the tensile element.
Figure 16B:
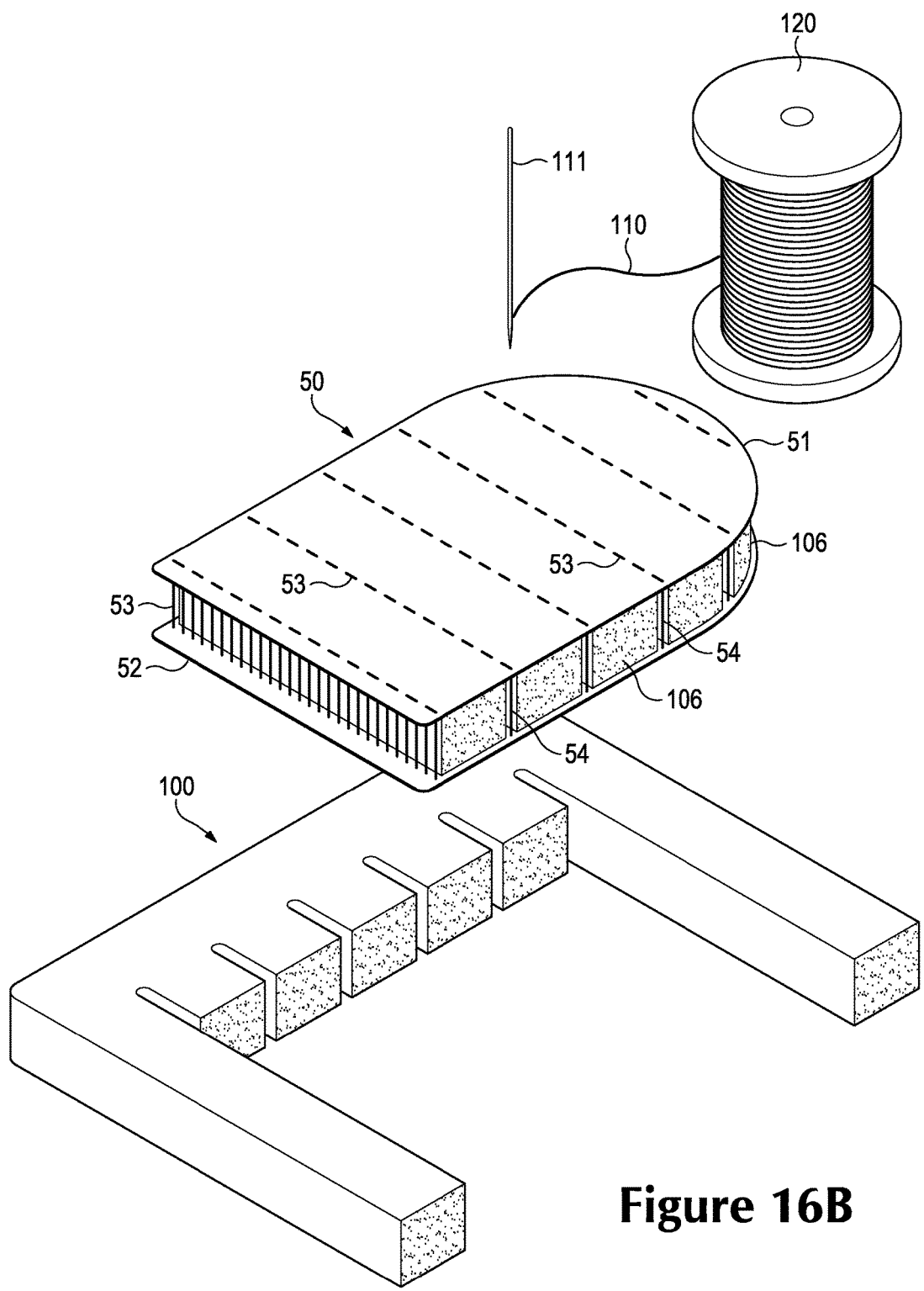

FIGS. 9-11F depict each of material layers 51 and 52 as having unitary or one-piece configurations. However, in further configurations, material layers 51 and 52 may be otherwise configured to have any number of unitary or one-piece portions. For example, as depicted in FIG. 16A, first material layer 51 is depicted as having two one-piece portions, whereas second material layer 52 is depicted as having three one-piece portions. In various configurations, either material layer 51 or 52 may have any of a number of one-piece portions, each of which may have any of a range of shapes, including regular geometric shapes as well as any other shape, regular or irregular.

Figure 16C:
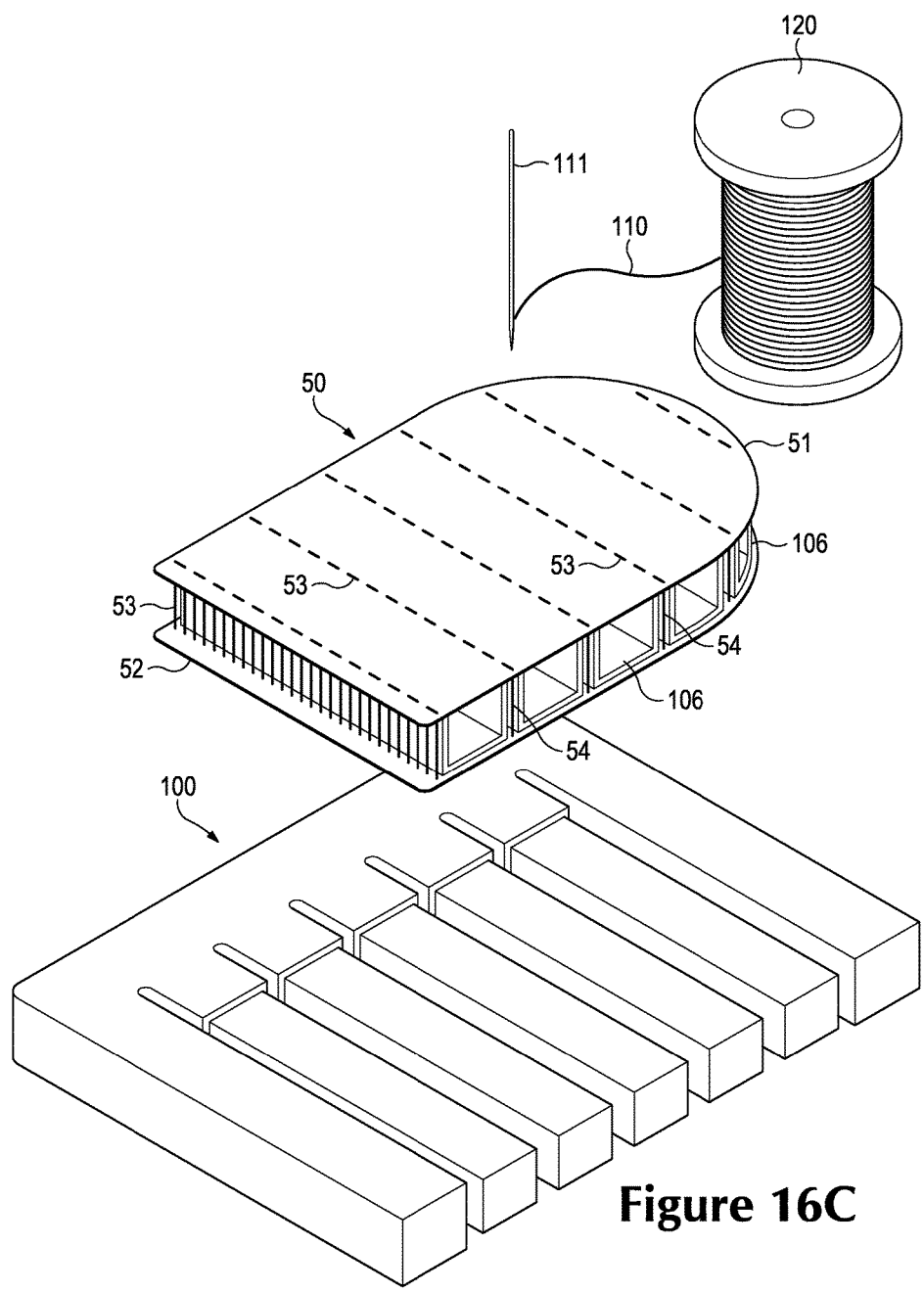

Although FIG. 10D depicts spacing structure 100 as having been removed, portions of spacing structure 100, or all of spacing structure 100, may remain within tensile element 50. For example, as depicted FIG. 16B, a plurality of remainder portions 106 of spacing structure 100 (which has been formed to include a foam material) have been left within tensile element 50. As a further example, FIG. 16C depicts alternate remainder portions 106 that have been left within tensile element 50, each remainder portion 106 being a peripheral or outer part of each of support portions 104.

In FIGS. 4-8C, tensile element 50 has strand segments 53 configured to extend between first material layer 51 and second material layer 52 in a particular way. However, in various configurations, strand segments 53 may extend between material layers 51 and 52 in other ways. For example, strand segments 53 within a particular row 54 may be relatively less densely packed, as depicted in FIG. 17B, or may be relatively more densely packed, as depicted in FIG. 17C. Moreover, although FIGS. 4-8C depict five rows 54 of strand segments 53 spanning tensile element 50, different numbers of rows 54 may span tensile element 50. For example, FIG. 18A depicts three relatively less densely packed rows 54 spanning tensile element 50, whereas FIG. 18B depicts nineteen relatively more densely packed rows 54 spanning tensile element 50.

FIGS. 9-11F depict tensile element 50 as being formed using a relatively simple stitching technique, such as a running stitch technique. However, in various configurations of the manufacturing process, a variety of stitching or sewing techniques may be employed, by hand or by machine, such as a double running stitching technique, a lockstitching technique, an overlock stitching technique, or any other stitching technique. Additionally, depending upon the stitching technique used, more than one strand 110 or portion of strand 110 may be used to form the stitches in a particular row 54. For example, as depicted in FIG. 17D, two portions of strand 110 are used to form row 54 of stitches, an additional strand 110 forms stitches that complement the first strand 110. As depicted, both strands 110 are in tension, and each strand 110 extends through both first material layer 51 and second material layer 52.

Figure 17G:
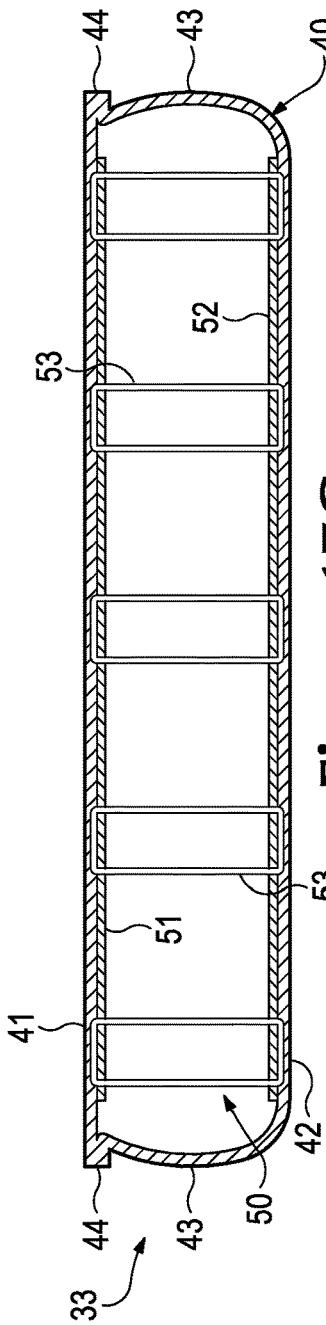
Figure 18A:
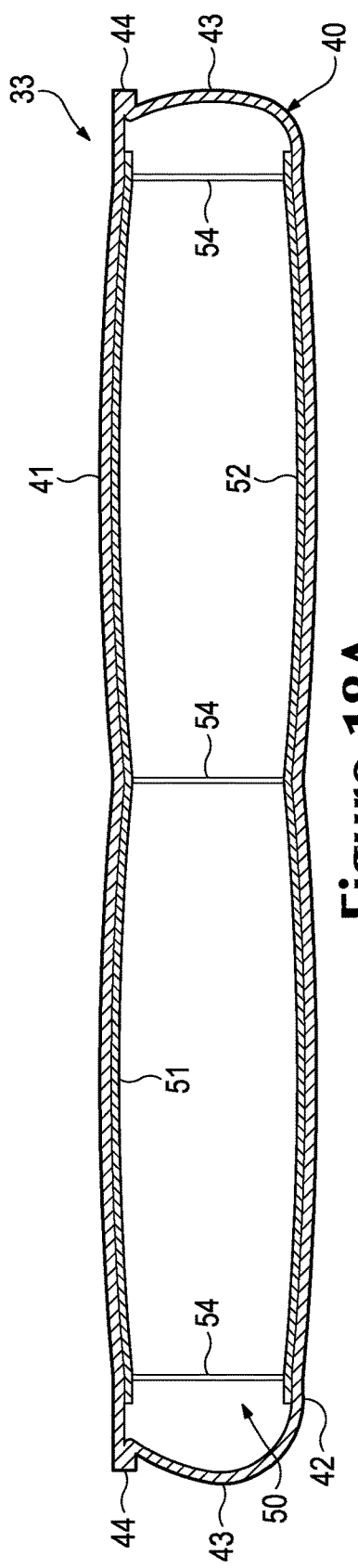

Alternatively, as depicted in FIG. 17E, one strand 110 extends through only first material layer 51, and another strand 110 extends through only second material layer 52. Both strands 110 are interlocked with each other in the interior void of chamber 33, between material layers 51 and 52, and may thereby be placed in tension upon pressurization of chamber 33. Various stitching techniques are also possible in other configurations of the manufacturing process. For example, FIG. 17F depicts an alternate simple stitching or sewing technique, and FIG. 17G depicts a technique in which first material layer 51 is joined to second material layer 52 with a plurality of strands, and a separate strand is used to form each of a plurality of stitches.

Additionally, although tensile element 50 and barrier 40 are depicted as being separate elements, they may be more integrally related in some configurations of the manufacturing process. For example, as depicted in FIG. 18C, the material used for first material layer 51 is first polymer sheet 71, and the material used for second material layer 52 is second polymer sheet 72. In this configuration, part or all of first barrier portion 41 is first material layer 51, and part or all of second barrier portion 42 is second material layer 52. Accordingly, various pluralities of strand segments 53 may extend (a) across an outward-facing surface of first barrier portion 41, and (b) across an outward-facing surface of second barrier portion 42.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A method of manufacturing a tensile element, the method comprising:
   locating a spacing structure between a first material layer and a second material layer, the spacing structure having a plurality of support portions separated by a plurality of gaps; and
   stitching through the gaps with at least one strand to join the first material layer to the second material layer to form the tensile element from the first material layer, the second material layer, and the strand, the tensile element having a plurality of segments of the strand that extend between the first material layer and the second material layer.

2. The method of claim 1, further comprising forming at least one of the first material layer and the second material layer from a textile.

3. The method of claim 1, further comprising maintaining at least one of the plurality of support portions between the first material layer and the second material layer after formation of the tensile element.

4. The method of claim 3, further comprising forming the at least one of the plurality of support portions from foam.

5. The method of claim 3, further comprising providing the at least one of the plurality of support portions with a hollow construction.

6. The method of claim 1, further comprising removing the spacing structure from the tensile element after formation of the tensile element.

7. The method claim 1, further comprising providing at least one of the plurality of gaps with a taper.

8. The method of claim 1, further comprising providing at least one of the plurality of gaps with a constant width along the length of the at least one of the plurality of gaps.

9. The method of claim 1, further comprising providing at least one of the first material layer and the second material layer with a first portion and a second portion, the first portion being spaced apart from the second portion.

10. The method of claim 1, further comprising providing the spacing structure with a serpentine gap extending continuously from a first end of the spacing structure to a second end of the spacing structure, the serpentine gap being formed by aligning the plurality of gaps relative to one another.

11. The method of claim 1, further comprising extending a portion of the stitching over at least one of the plurality of support portions.

12. The method of claim 11, wherein extending a portion of the stitching over at least one of the plurality of support portions includes stitching in two different gaps located on opposite sides of the same one of the plurality of support portions.

13. A method of manufacturing a tensile element, the method comprising:

locating a first material layer between a spacing structure and a second material layer, the first material layer being in contact with the second material layer, and the spacing structure having a plurality of support portions;

stitching with at least one strand both between the support portions and over at least one support portion to join the first material layer to the second material layer and to form a tensile element from the first material layer, the second material layer, and the strand; and spacing the first material layer from the second material layer to position a plurality of segments of the strand to extend between the first material layer and the second material layer.

14. The method of claim 13, further comprising forming at least one of the first material layer and the second material layer from a textile.

15. The method of claim 13, further comprising removing the spacing structure from the tensile element after formation of the tensile element.

16. The method claim 13, further comprising providing the spacing structure with a plurality of gaps that separate adjacent ones of the plurality of support portions.

17. The method of claim 16, further comprising providing the plurality of gaps with one of a taper and constant width along the length of the plurality of gaps.

18. The method of claim 13, further comprising providing at least one of the first material layer and the second material layer with a first portion and a second portion, the first portion being spaced apart from the second portion.

19. The method of claim 13, further comprising providing the spacing structure with a serpentine gap extending continuously from a first end of the spacing structure to a second end of the spacing structure and between the plurality of support portions.

20. The method of claim 13, wherein stitching over at least one support portion includes stitching in two different gaps located on opposite sides of the same one of the plurality of support portions.

* * * * *